United States Patent [19]
VanHorn

[11] Patent Number: 5,773,954
[45] Date of Patent: Jun. 30, 1998

[54] BATTERY CHARGING STATION FOR SHOPPING CART MOUNTED PORTABLE DATA COLLECTION DEVICES

[75] Inventor: David B. VanHorn, Columbia Station, Ohio

[73] Assignee: Telxon Corporation, Akron, Ohio

[21] Appl. No.: 723,358

[22] Filed: Sep. 30, 1996

Related U.S. Application Data

[63] Continuation-in-part of Ser. No. 668,343, Jun. 26, 1996.
[51] Int. Cl.[6] ........................ H01M 10/44; H01M 10/46; B62D 39/00
[52] U.S. Cl. .......................................... 320/2; 280/33.991
[58] Field of Search ........................... 320/2; 280/33.991, 280/33.992

[56] References Cited

U.S. PATENT DOCUMENTS

| | | |
|---|---|---|
| 4,973,952 | 11/1990 | Malec et al. . |
| 5,064,012 | 11/1991 | Losego ................................... 180/19.1 |
| 5,250,789 | 10/1993 | Johnsen . |
| 5,295,064 | 3/1994 | Malec et al. ............................. 364/401 |
| 5,323,098 | 6/1994 | Hamaguchi et al. ....................... 320/2 |
| 5,361,871 | 11/1994 | Gupta et al. . |

FOREIGN PATENT DOCUMENTS

| | | |
|---|---|---|
| 8-40276 | 2/1996 | Japan . |
| 2286567 | 8/1995 | United Kingdom . |

*Primary Examiner*—Peter S. Wong
*Assistant Examiner*—Patrick B. Law
*Attorney, Agent, or Firm*—Watts, Hoffmann, Fisher & Heinke Co., L.P.A.

[57] ABSTRACT

A charging station for charging a battery that powers a portable data collection device. The shopping cart carrying the data collection device is provided with one or more connection elements that engage a guide rail of the charging station and conduct current to the battery disposed on the cart. The data collection device is mountable to a shopping cart and includes a housing having a clamping assembly for releasably clamping the housing to a pushing bar of a shopping cart. The housing defines an interior region supporting device electronics. The device further includes an interactive touch sensitive visual display screen and a retractable, tethered dataform reader releasably mounted on the housing. When mounted on the housing, an imaging assembly and illumination assembly of the reader are continuously actuated to read a dataform presented to the reader. When removed from the housing, the reader is actuated by depressing a trigger on the reader. The device also includes a magnetic stripe reading assembly and communications circuitry including a radio transceiver module.

14 Claims, 15 Drawing Sheets

CHECKOUT
SUBROUTINE

HELP FIND
SUBROUTINE

RECIPE SUBROUTINE

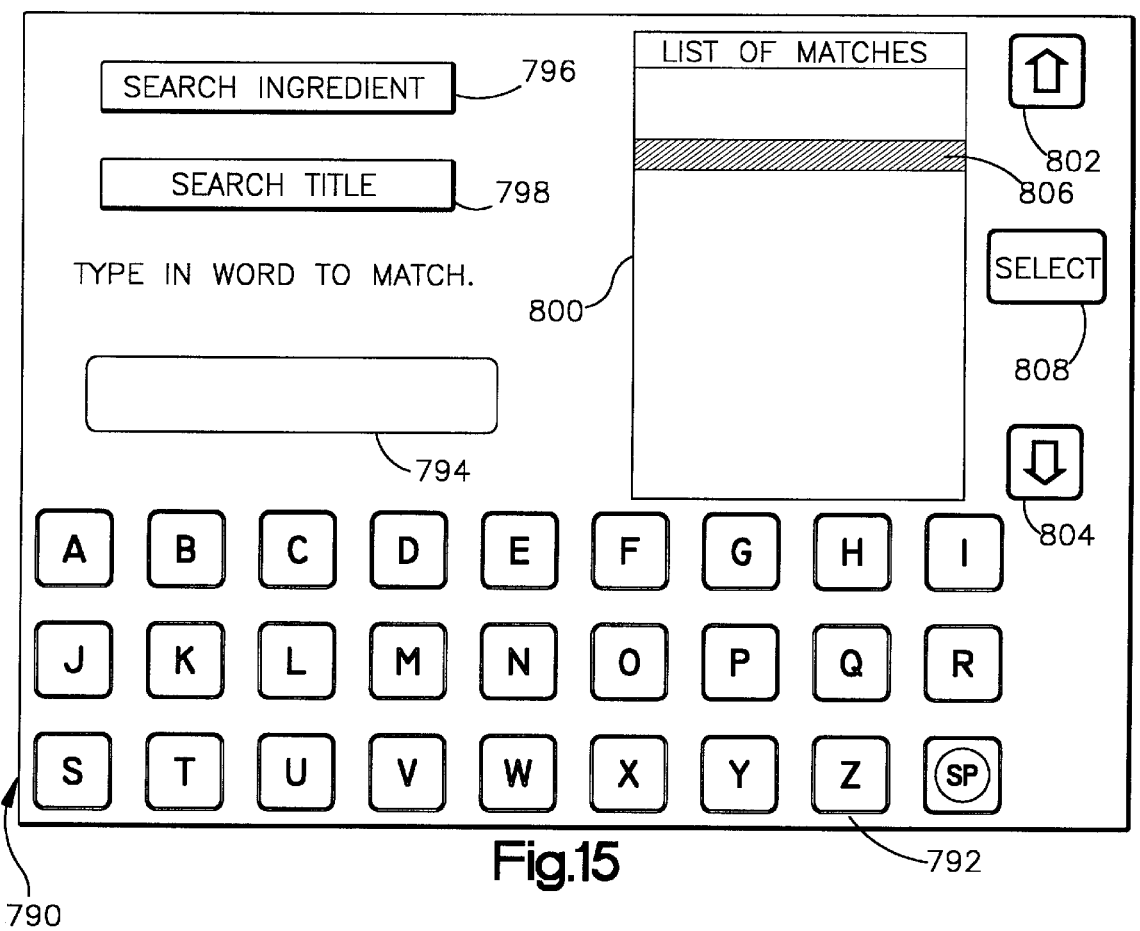
Fig.15
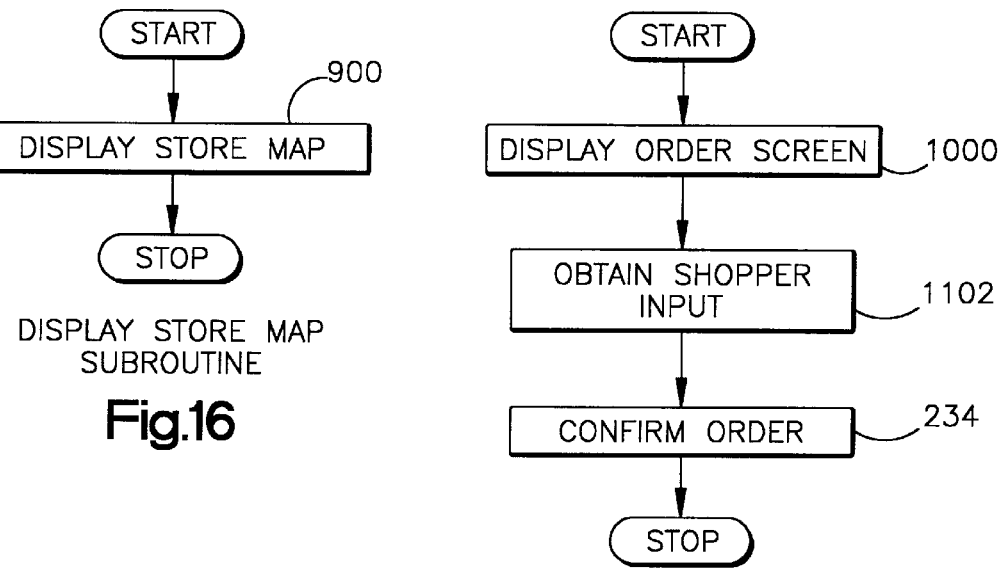
DISPLAY STORE MAP
SUBROUTINE
Fig.16
ORDER A PREPARED ITEM
WHILE YOU SHOP SUBROUTINE
Fig.17

BATTERY CHARGING STATION FOR SHOPPING CART MOUNTED PORTABLE DATA COLLECTION DEVICES

CROSS-REFERENCE TO RELATED APPLICATIONS

This application is a continuation-in-part of U.S. patent application Ser. No. 668,343, for SHOPPING CART MOUNTED PORTABLE DATA COLLECTION DEVICE WITH TETHERED DATAFORM READER, filed Jun. 26, 1996, now pending.

FIELD OF THE INVENTION

This invention relates to a portable data collection device adapted for mounting to a shopping car. More particularly, the invention relates to an apparatus for charging batteries that power shopping cart mounted data collection devices.

BACKGROUND OF THE INVENTION

In a retail store or grocery store, a customer will typically push a shopping cart through the aisles selecting items of merchandise. When the shopper is finished, he or she proceeds to a cash register/data terminal in a check-out area of the store. The cash register/data terminal typically includes a hand held and/or fix mounted dataform reading and decoding assembly ("dataform reader"). If a fix mounted dataform reader is being used, a store clerk presents each item's bar code dataform to the dataform reader, that is, the dataform is moved along an upper surface of a glass window behind which the dataform reader is mounted. If a hand held dataform reader is being used, the clerk "aims", the reader at each item's dataform as the item moves past the terminal. In each case, a "good read and decode" signal will be actuated after each successful dataform read and decode to notify the clerk that the item's dataform was successfully read and decoded. The signal may be an audible tone or "beep". If no "beep" is heard, the clerk will repeat the reading process for the item until successfull. Each item's dataform includes a product identifier used to retrieve (from a remote database) product description and price information for the item. A visual display on the terminal displays the item's product description and price for each item upon reading and decoding the dataform. When all the items being purchased by a customer have been presented to the reader, the terminal provides a total price for all the customer's items and prints a register receipt listing a product description and price for each item, a subtotal for all items, a tax amount and a total amount due. The amount tendered by the customer is input by the clerk using a terminal keypad. The amount tendered and change due are also printed on the register receipt. The clerk collects payment from the customer and dispenses any change.

A number of problems are associated with such a cash register/data terminal system, including: (1) inconvenience for customers waiting in long check-out lines; (2) use of valuable floor space for the check-out area when a number of cash register/data terminals are utilized; and (3) product prices have to be either printed on labels affixed to each item or marked on shelving adjacent the item's shelf space so a customer knows the price of a selected item.

In one proposed alternative system, a customer is presented with a portable hand held data terminal including a hand held dataform reader when he or she enters the store. The customer uses the reader to read a bar code dataform on each item prior to (or concurrently with) placing the item into his or her shopping cart. A memory in the portable data terminal stores a retrieved product description and price for each selected item. At the check-out area, a store clerk merely prints a register receipt based on the data stored in the dataform reader and collects payment from the customer.

There are a number of disadvantages associated with this proposed alternative portable data terminal system. First, the customer must carry the data collection device during the shopping session. The device represents another item which must be handled by the customer in addition to the shopping cart, items being purchased and possibly children. This is inconvenient for the customer and can lead to the device being damaged through mishandling or dropping of the device by a hurried customer. Second, the retailer must dedicate floor space to the entrance area where the devices are presented to and collected from customers. Third, the device is susceptible to being stolen. Further still, in view of the likelihood that a typical retailer will store and maintain a relatively large number of battery powered data collection devices, there is a need for an efficient means for recharging the batteries of such devices.

Accordingly, what is needed is a more convenient system for providing customers with a portable data collection device including a dataform reader which can be used by the customer to read dataforms of items selected for purchase during a shopping session.

SUMMARY OF THE INVENTION

A portable data collection device including a hand held dataform reader is disclosed. The device includes a housing having a clamping mechanism for securely clamping the housing to a pushing bar of a shopping cart. The housing defines an interior region in which electrical circuitry of the device is disposed.

The device further includes a hand held dataform reader which is tethered with a retractable electrical cable to the housing. The reader operates in two modes; a presentation mode and a hand held mode. When the dataform reader is disposed in an opening in the housing, the reader's imaging and illumination assemblies are continuously actuated to read a dataform of an item presented to the reader. This is referred to as the presentation mode. In the hand held mode of operation, the reader is pulled from the opening in housing. When the reader is pulled away from the housing, the imaging and illumination assemblies are deactivated. The customer moves the reader so as to "aim" it at a selected item's dataform. A trigger on the reader is depressed to actuate the reader's imaging and illumination assemblies. The illumination assembly includes a targeting assembly to aid in aiming the reader at the target dataform. When the imaging assembly generates a decodable image of the dataform, decoding circuitry disposed in the housing decodes the imaged dataform. When the dataform is successfully read and decoded, a speaker mounted in the housing emits an audible tone or "beep" to indicate to the customer that the item's dataform has been read and decoded. The reader is then returned to its position in the housing opening. The cable connecting the reader and electrical circuitry in the housing is automatically recoiled by a recoil mechanism in the housing.

The reader includes the illumination assembly for illuminating a selected item's dataform with a plurality of illumination LEDs and also includes targeting LEDs which generate a "crosshair" pattern for properly aiming the device at the target dataform. The crosshair pattern size substantially corresponds to the field of view or target area of the imaging assembly. The illumination assembly also includes a lens array for properly focusing the light emitted by the illumination and targeting LEDs over an area substantially corresponding to the field of view or target area of the imaging assembly.

The imaging assembly is preferably a two dimensional charge coupled device imaging assembly including a board camera assembly with a two to dimensional photosensor array. The imaging assembly further includes a control and decoder printed circuit board on which circuitry is mounted including a microprocessor for controlling operations of the device and image processing and decoding circuitry for processing and decoding the dataform image from a composite analog video signal generated by the board camera assembly. The imaging assembly of the present invention may be used to read both one and two dimensional bar code dataforms as well as matrix dataforms (MaxiCode, Data Matrix, Code 1, etc.). A one dimensional bar code comprises one horizontal line of alternating vertically oriented black and white bars of varying widths, e.g., UPC bar code, while a two dimensional bar code consists of a plurality of horizontal lines of bar code, e.g., PDF-417, Supercode, etc.

As noted above, the electrical circuitry of the portable data collection device includes the microprocessor for controlling operations of the device. The circuitry also includes the image processing and decoding circuitry for decoding a dataform read by the dataform reader and communications circuitry for sending data to and receiving data from remote devices. The housing also supports a visual display screen with a touch sensitive overlying layer providing for user interface with the microprocessor. When an item's dataform is read, the item's price and product description is retrieved from a remote database and displayed on the visual display screen. The communications circuitry, including a radio frequency (rf) transceiver module, retrieves the item's price and product description via a cellular communications network of which the device is a part. At the end of a shopping session, a listing of all items and their product descriptions and prices are displayed on the screen and a customer receipt is printed by a printing assembly disposed in the housing.

The device display screen displays a number of screen menus and associated touch sensitive response blocks and/or virtual keypads and keyboards for user input of data and commands to the device. Menu driven options presented to a customer include selecting recipes for an item whose dataform was read and ordering prepared items from the store's delicatessen, meat department, etc. The communications circuitry permits a location of the device to be monitored for security purposes.

Another aspect of the invention provides a charging station for charging batteries used to power the shopping cart mounted data collection devices. The charging station includes a guide track, preferably defining a T-shaped channel, configured to receive a portion of a shopping cart. For example, the cart may have a connection element projecting from its frame having a shape corresponding to that of the track. In this manner, carts can be wheeled into proximity with the track and nested together with their connection elements disposed in the channel. The T-shaped channel and shopping cart connection elements have means for establishing electrical contact so as to conduct current from a source of electricity to the batteries located on the carts. The channel may include one or more surfaces at least a portion of which is electrically conductive, and the connection elements may have electrical contacts spring biased into engagement with the conducting surfaces. This permits a retailer to charge the batteries that power the data collection devices while storing the shopping carts to which the devices are mounted. In a preferred embodiment, the charging station is provided with a cart release mechanism that controls release of carts from the guide track (or other part) of the charging station. The release mechanism may be actuated in various ways and may interface with a microprocessor or like device in order to determine whether release of the carts is authorized.

These and other advantages and features of this invention will be clearly understood through consideration of the following detailed description of the invention in conjunction with the accompanying drawings.

BRIEF DESCRIPTION OF THE DRAWINGS

FIG. 15 is a representative screen layout displayed on the touch sensitive to display screen of the portable data collection device of FIG. 1 in connection with a routine for providing a recipe using a selected food item;

FIG. 16 is a flow chart representing processing steps of the portable data collection device of FIG. 1 in connection with a routine for displaying a layout of the retail store the portable data collection device of FIG. 1 is used in;

FIG. 17 is a flow chart representing processing steps of the portable data collection device of FIG. 1 in connection with a routine for permitting a customer to order a prepared item during a shopping session;

DETAILED DESCRIPTION OF THE PREFERRED EMBODIMENTS

Figure 1:
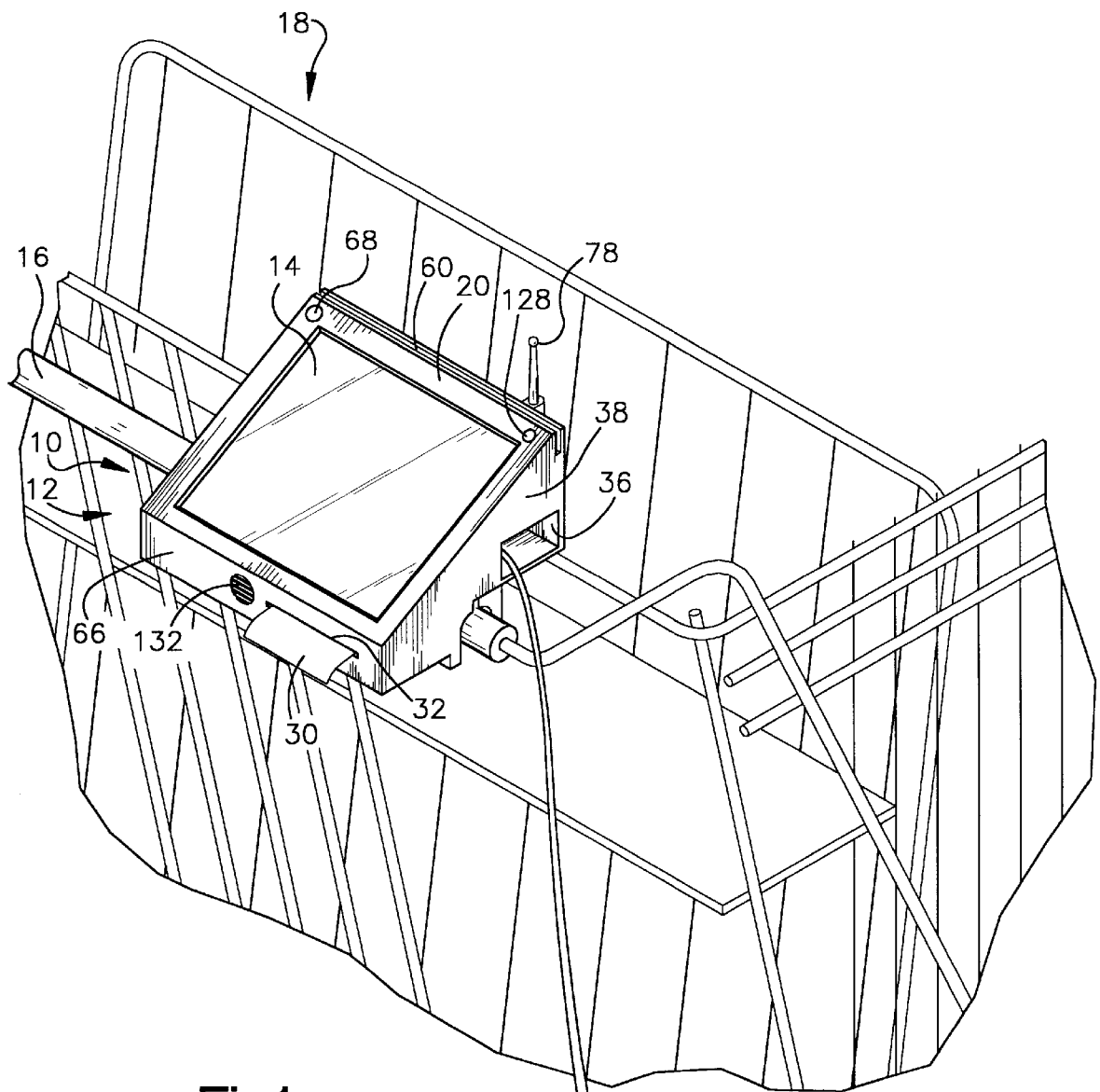
FIG. 1 is a perspective view of a portable data collection device of the present invention as mounted on a shopping cart with a dataform reader of the device being employed in a hand held mode.
Figure 2:
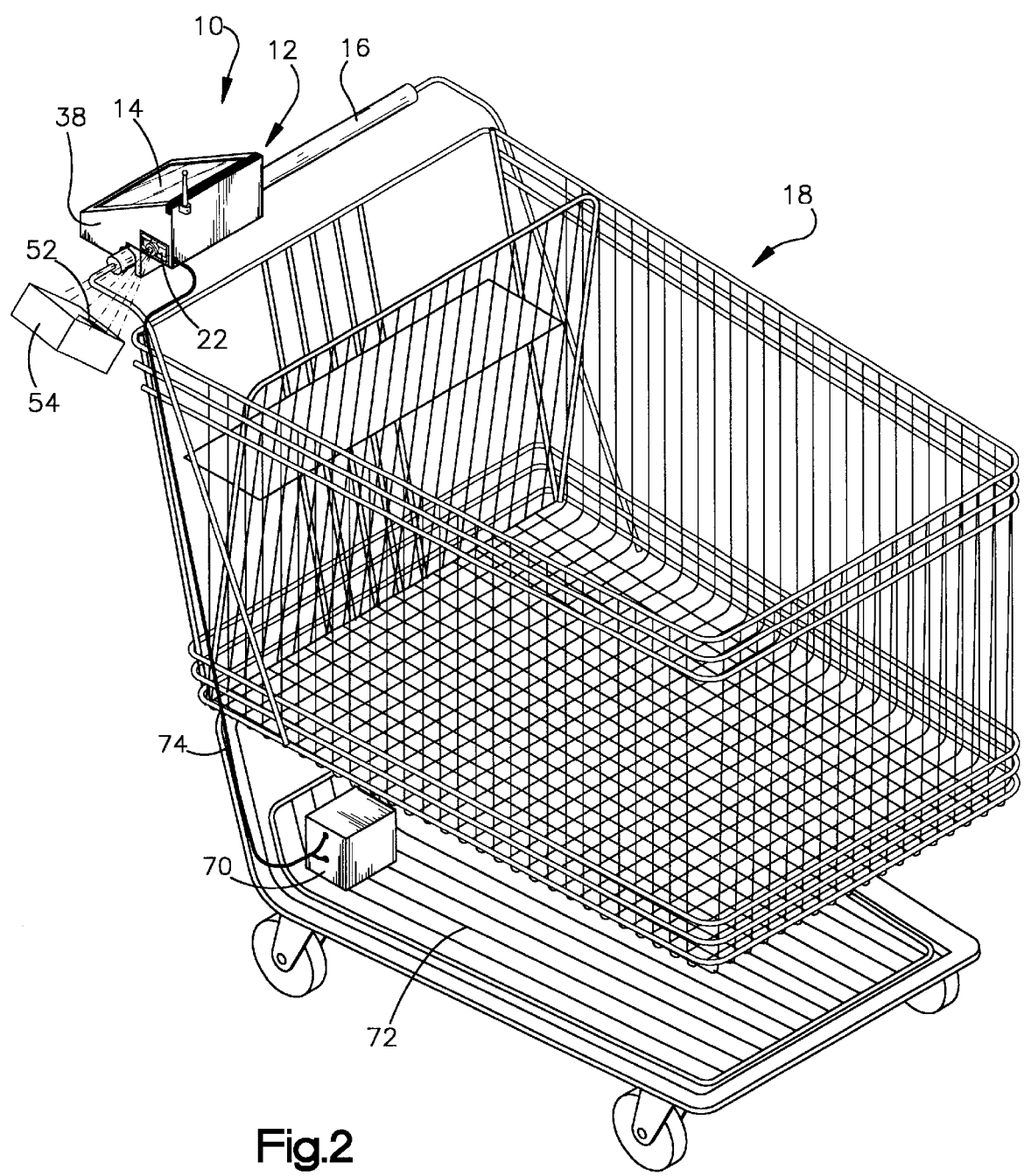
FIG. 2 is another perspective view of the portable data collection device of FIG. 1 as mounted on the shopping cart with the dataform reader of the device being employed in a presentation mode.

A portable data collection device according to the present invention is shown generally in FIGS. 1 and 2 and includes housing 12 supporting an interactive touch sensitive display screen 14. The housing 12 is mounted on a pushing handle 16 of a shopping cart 18. The interactive touch display screen 14 is mounted to be visible through an opening in an inclined front surface 20 of the housing 12. The display screen 14 is at a proper angle for easy viewing by a customer having his or her hands on the shopping cart handle 16.

A dataform reading assembly including a hand held bar code dataform reader 22 is retractively tethered or attached to the housing 12 with an electrical cable 24. The cable 24 includes a plurality of conductors 140 (FIG. 4) for supplying power to the reader 22, coupling a signal 28 (FIG. 5) representing a bar code dataform 30 (shown in phantom in FIG. 1 and in top plan in FIG. 4) to a processor 32 mounted on a control and decoder printed circuit board 33 (FIG. 3 and schematically in FIG. 5) in the housing 12. The circuitry on the control and decoder board 33 and the dataform reader 22 comprise a dataform reading and decoding assembly.

The dataform reader 22 operates in two modes: a) a hand held mode; and b) a presentation mode. The hand held mode of operation is represented in FIG. 1 wherein the reader 22 is removed by the customer from an opening 36 in a side 38 of the housing 12. When supported in the opening 36, the reader 22 extends slightly beyond the side 38 so that the customer can easily grasp a front portion of the reader and slide it out of the opening. The customer moves the reader 22 to a dataform 30 of an item so desired to be purchased or priced by the customer. The customer depresses a trigger 40 to actuate an imaging assembly 42 and an illumination assembly 44 of the reader 22. The illumination assembly 44 provides a uniform illumination pattern that substantially corresponds to an imaging area or field of view 46 of the imaging assembly 42 and additionally generates a more intense crosshair illumination pattern 48 to aid the customer in positioning the reader 22 so that the dataform 30 of an item 50 is properly within the imaging area of the reader. The uniform illumination pattern and crosshair aiming pattern are rapidly alternated between off and on states, such that one is off while the other is on. This alternation of illumination pattern avoids the difficulty of having to decode a captured dataform image which has an intense crosshair illumination pattern imposed thereon. The alternation of the illumination and crosshair patterns is rapid enough that it appears to the customer that the crosshair aiming pattern is continuously on.

While keeping the trigger 40 depressed, the customer aims the crosshair pattern 48 at a center of the dataform 30. The customer moves the reader 22 toward the item 50 until an audible tone or "beep" is emitted by a speaker 130 indicating that the dataform 30 has been successfully read and decoded. The item's price and product name or description and product size will appear on the display 14 (see FIG. 9 and block 222). After the "beep" is heard, the reader 22 is returned to the opening 36 and slid in.

In the presentation mode of operation, the reader 22 is disposed in the housing opening 36 and the customer reads a dataform 52 affixed to an item 54 by moving the item to the reader 22. While the reader 22 remains in the housing opening 36, a magnetic switch 158 (FIG. 4) enclosed in a back portion of a modular housing 142 of the reader 22 is turned on by a magnet 160 positioned in the opening 36 when the reader is in the opening. Actuation of the magnetic switch 158 causes the imaging assembly 42 and the illumination assembly 44 to be actuated. Thus, the reader 22 is continuously ready to read a dataform when it is dosed in the opening 36. When a "beep" is heard, the customer knows that the dataform 52 has been successfully imaged and decoded. In this mode, the illumination pattern is continuously on and the crosshair illumination pattern is deactivated since properly "aiming" the reader 23 is not a concern. The hand held mode is advantageously used when an item on a shelf is too large or too clumsy to move from the shelf or if the customer just wishes to check a price without removing the item from the shelf. The presentation mode is advantageously employed when a selected item is smaller and more easily handled. A to magnetic stripe reader 60 is molded into an upper surface 125 of the housing 12. The stripe reader 60 includes a slotted opening 61a in the upper surface and includes a stripe sensor and reader 61b (FIG. 3) disposed along the opening. Appropriate magnetic stripe decoding circuitry (FIG. 5) is mounted on the control and decoder board 33. The magnetic stripe reader 60 is used in connection with a customer identification subroutine to be discussed below. The housing 12 also supports a thermal printing assembly 62 (FIG. 3) which functions to print out a paper receipt 63 for the customer at the completion of shopping session or a recipe for an item. The printing assembly 62 discharges the receipt or recipe printout through a slot shaped opening 64 in an upright front surface 66 of the housing 12. An assistance request button 68 extending through an opening in the inclined front surface 20 of the housing 12 is activated by a shopper to request assistance from store personnel as will be discussed below in connection with FIG. 20.

The device 10 also includes a high capacity battery 70 (FIG. 2) which is mounted in a case disposed on a bottom rack 72 of the shopping cart 18. The battery 70 preferably uses lead-acid technology because of its low cost, high energy capacity and lack of memory effect. The weight associated with a lead-acid battery is not a concern because it is mounted on the cart 18. A typical 6 volt, three cell lead-acid battery such as the type used on a motorcycle, has an energy capacity sufficient to power the device 10 for a time period in excess of 24 hours. A power lead 74 connects the battery 70 to power circuitry 126 (shown schematically in FIG. 5) in the housing 12.

Figure 3:
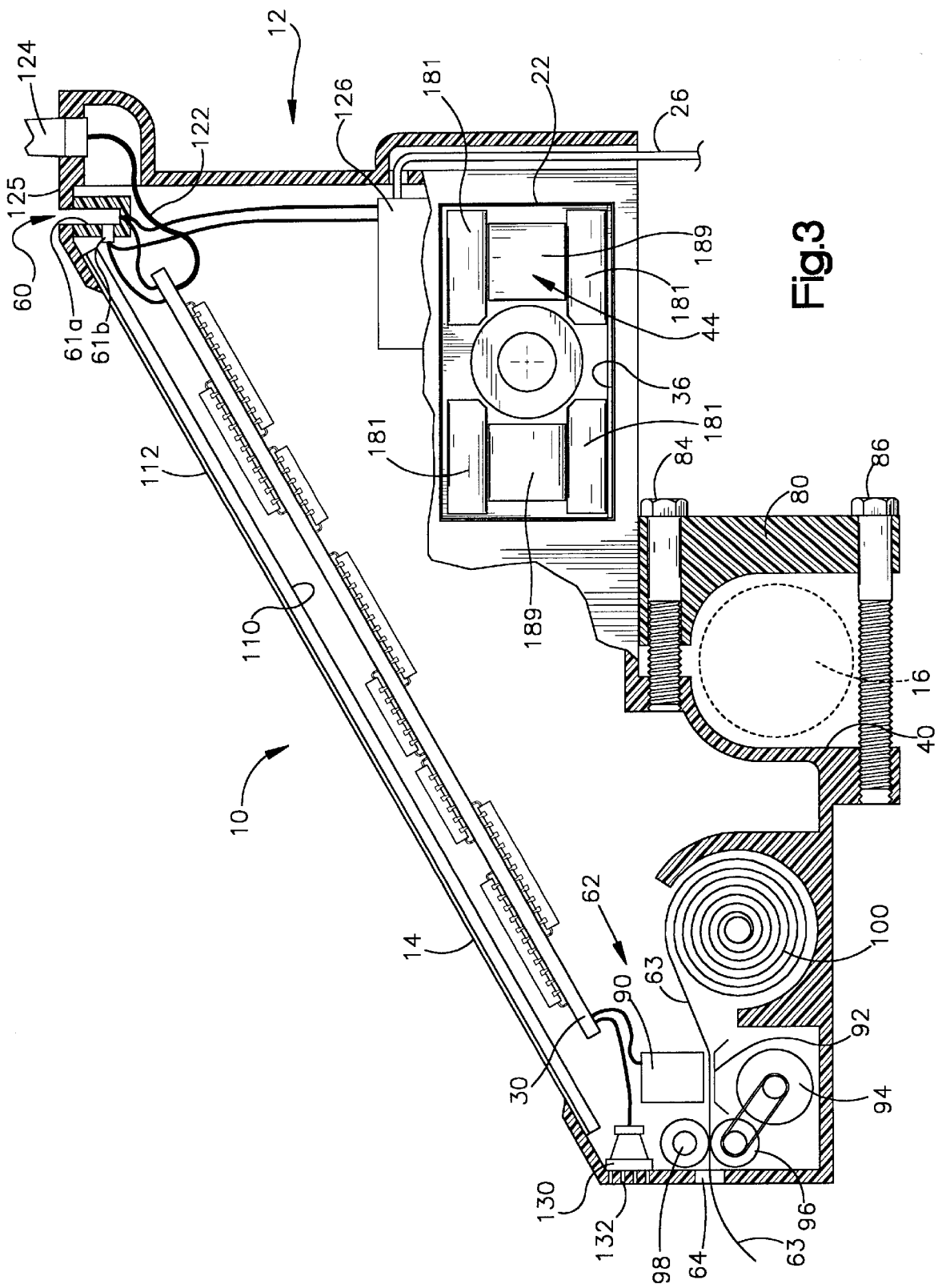
FIG. 3 is a view, partly in section and partly in elevation, of the portable data collection device of FIG. 1.

FIG. 3 is a view, partly in section and partly in elevation, of the housing 12. The device 10 is secured to the shopping cart handle 16 by a clamping assembly which clamps the housing 12 to the cart push handle 16. The clamping assembly includes adjustable clamp 80 and an arcuate clamping surface 81 of the housing 12. Two sets of two threaded bolts 84, 86 (only one set of two threaded bolts can be seen in FIG. 3) extend between adjustable clamp 80 and threaded openings in the housing 12 to secure the clamp 80 to the housing 12. When the two sets of threaded bolts 84, 86 are tightened, the housing 12 is secured to the pushing handle 16 of the cart 18.

The thermal printer assembly 62 includes a thermal printhead 90 and an opposing platen 92 to position the paper 63 against the printhead 90. A motor 94 drives a feed roller 96. The feed roller 96 operates in conjunction with an idler roller 98 to draw paper 63 from a paper roll 100 past the printhead 90 and feed the receipt or recipe printout 63 out of the slot shaped opening 64 in the housing 12. Printer driver circuitry 101 for operating the printer assembly components is mounted on the control and decoder printed circuit board 33 disposed in the housing 12. At least a portion of the circuitry 101 may be embodied in code stored in a memory 106 represented by a memory chip on the control and decoder printed circuit board 33 and executed by the processor 32, both on printed circuitry board 102.

The user interactive display screen 14 includes a liquid crystal display (LCD) display panel 110 and an overlying touch sensitive resistive contact panel 112. Circuitry for operating the screen 14 and the panel 112 includes LCD driver circuitry 114 and contact panel driver circuitry 116. Additionally, the circuitry 114, 116 for operating the LCD display and contact panels 110, 112 may, at least in part, be implemented in software stored in the memory 106 and executed by the processor 32.

The spread spectrum radio communications circuitry 118 may be embodied in one or more IC chips mounted on the printed circuit board 33. Alternatively, the spread spectrum communications circuitry 18 may be implemented on a separate printed circuit board with a PCMCIA interface and secured to the printed circuit board 102 through a PCMCIA standard slot interface. An antenna lead 122 connects the communications circuitry to an antenna mast 124 extending through an opening in the upper surface 125 of the housing 12. Alternatively, the antenna mast could be disposed inside the housing. The communications circuitry 118 includes a radio frequency (rf) radio transceiver module which communicates decoded bar code data to a host computer 1260 (schematically shown in FIG. 19) utilizing a spread spectrum cellular radio network (also shown schematically in FIG. 19). The decoded data includes a product identifier encoded in the items dataform. In turn the transceiver module receives data relating to the item from the host computer 1260, e.g., a product name or description for the item, the price of the item, etc. The host computer 1260 retrieves the data from a database to containing product information which includes the product identifier as a search key.

As previously discussed, power to operate the device 10 is supplied by the battery 70 disposed on the bottom rack 72 of the shopping cart 18. The power lead 74 interconnects the battery 70 to power supply circuitry 126 mounted on the control and decoder board 33 within the housing 12. The housing 12 also includes a power supply port 128 where an external power source may be connected for charging the battery 70. The power supply circuitry 126 controls charging and controls converting the battery power supply to appropriate electrical parameters for use by various circuitry and electronic modules of the device 10.

The housing 12 also supports the speaker 130 which is mounted behind a grated opening 132 in the housing 12. The speaker 130 is driven by audio indicator driver circuitry 134 mounted on the control and decoder board 33 and provides audio feedback in the form of a ½ second "beep" to the customer to indicate a successful bar code dataform read and decode.

Figure 4:
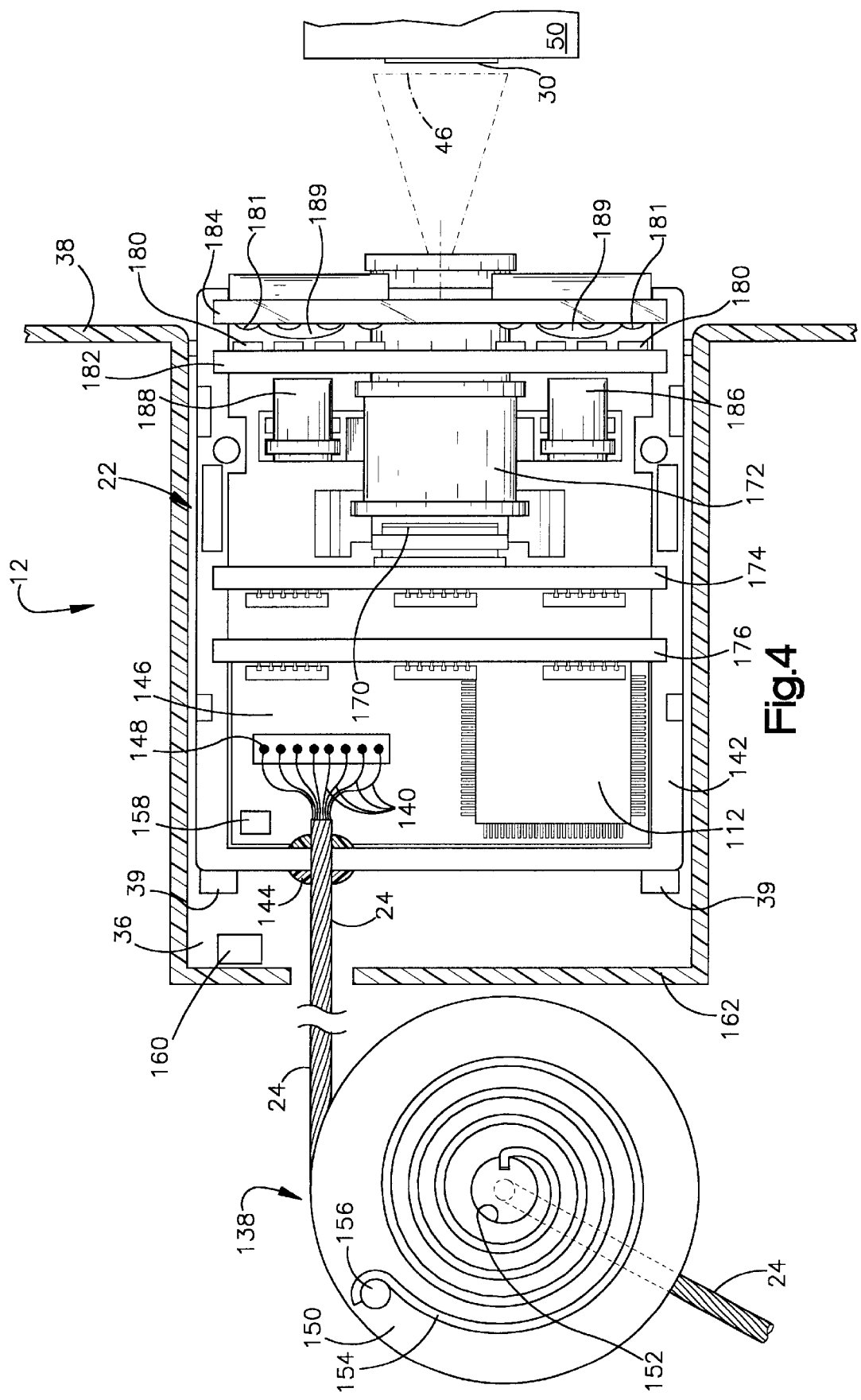
FIG. 4 is a view, partly in section and partly in top plan, of the retractable, tethered dataform reader of the portable data collection device of FIG. 1.
Figure 5:
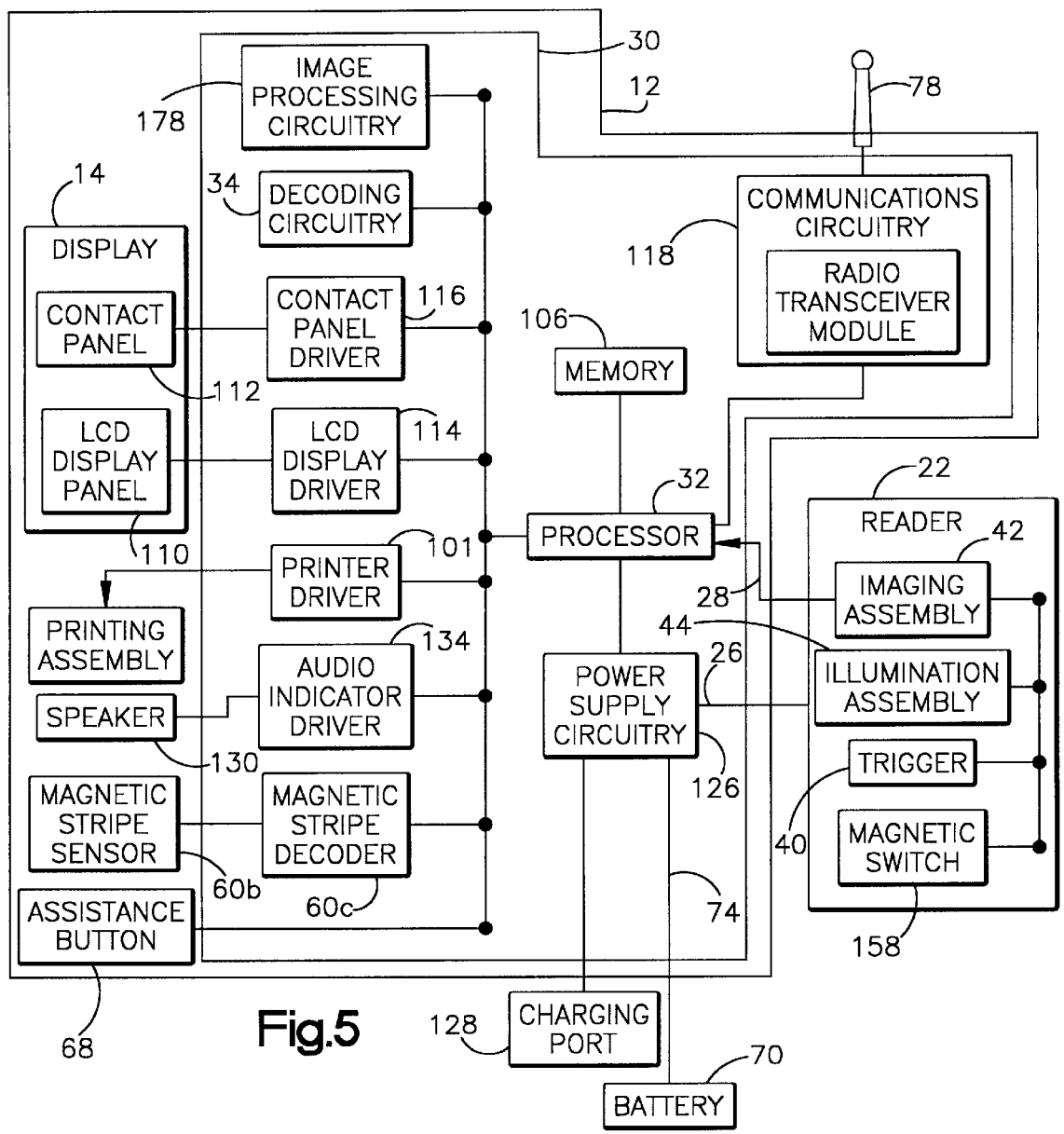
FIG. 5 is a schematic representation of selected electronic modules and circuitry of the portable data collection device of FIG. 1.

FIG. 4 is a cut-away view of the reader 22 and a portion of the device 10 in the region of the opening 36 showing details of a recoil or cable retraction mechanism 138 of the dataform reader 22. The reader 22 is connected to the housing 12 with the cable 24. The cable 24 includes the plurality of conductors 140 for: a) coupling operating power 26 to the reader 22; b) coupling the composite video signal 28 from the reader 22 to the processor 32; and c) coupling control signals from the processor 32 to the reader 22. The cable 24 is secured to a housing 142 of the reader with a clamping grommet 144 to prevent the reader 22 from being physically separated from the cable 24.

The reader housing 142 is a modular unit that includes a top half and a mating bottom half. Only the bottom half of the reader housing is shown in FIG. 4 so that the internal components of the reader 22 are visible in the Figure. To further secure the reader 22 to the cable 24, a knot (not shown) may be tied in the cable just inside the reader housing 142. The plurality of conductors 140 are electrically coupled to a printed circuit board 146 within the reader housing 142 by a connector 148.

Within the housing 12, the cable 24 is wrapped around a recoil spool 150. The recoil spool 150 spins about a center pin 152 of the spool. The pin 152 is a hollow cylinder such that the cable 24 may be threaded through the pin 152 and connected to circuitry within the housing 12. A spirally wound bias spring 154 is secured to the pin 152 at the center of the recoil spool 150 and to the spring tab 156 at the perimeter of the re-coil spool 150 to bias the spool in a counter clockwise direction (as viewed in FIG. 4). This arrangement keeps the cable 24 under tension when the reader 22 is removed from the housing opening 20.

As discussed previously, the reader 22 includes a user trigger 40 (shown in FIG. 1) which is depressed by the customer to initiate a bar code reading session when the reader is being used in the hand held mode. The trigger 40 prevents the reading of unintended dataforms as the reader 22 is being moved to and aimed at a desired dataform. When the reader 22 is positioned in the housing opening 36 of the console housing 12, the trigger 40 is not accessible. Furthermore, because the reader 22 is intended to be used to read a dataform of any item presented to the reader, a manually activated read button is impractical. Therefore, a magnetic switch 158 in the reader housing 142 is "tripped" to an on state by a magnet 160 mounted just inside of the housing wall 162 defining the opening 36 when the reader 22 is positioned in the opening. The magnetic switch 158 causes the imaging assembly 42 and the illumination assembly 44 of the reader 22 to be actuated. The edge formed by the housing wall 162 and the side wall 38 is rounded (FIG. 4) to avoid wearing an outer surface of the cable 24.

The reader 22 is preferably utilizes a two-dimensional imaging assembly. The imaging assembly 42 includes a two-dimensional photosensor array 170 (FIG. 4) and an optic assembly supported in a lens housing or shroud 172 for focusing an image of the dataform 30 in the target area 46 onto the photosensor array 170. Circuitry on printed circuit boards 174, 176 and 146 operate to sequentially read out charges accumulating on photosensors of the photosensor array 104 and generate the analog composite video signal 28 representative of consecutive frames of the imaged dataform 30. The video signal 28 is coupled to image processing circuitry 178 disposed on the control and decoder printed circuit board 33 which converts a portion of the composite video signal representing a captured image frame into a series of gray scale values whose magnitudes represent the relative reflectivity of portions of the imaged dataform 30.

The image processing circuitry 178 then performs cell extraction analysis to reconfigure the imaged dataform in the memory 106. The decoding circuitry 34 then decodes the representation of the imaged dataform stored in the memory 106. At least a portion of the image processing and decoding circuitry may be implemented in code executed by the processor 32.

The illumination assembly 44 of the reader 22 includes four sets of four surface mount illumination LEDs 180 positioned on a printed circuit board 182 (only two sets of the four sets of four illumination LEDs are seen in FIG. 4). The illumination LEDs direct illumination through corresponding aligned lens 181 of a lens array 184 towards the imaging target area 46. Two targeting LEDs 186, 188 operate to direct illumination through aligned lens 189 in the lens array 184 and generate the crosshair illumination pattern in the target area 46 to assist the operator in relatively positioning the reader 22 and the dataform 30. As noted above, the crosshair illumination pattern is only generated when the reader 22 is used in the hand held mode. Thus, the targeting LEDs 186, 188 are not energized when the reader 22 is used in the presentation mode. Aligned openings in the board 182 permit illumination from the targeting LEDs to be directed through the lens 189. A more detailed description of the components of a suitable two dimensional imaging assembly for a hand held dataform reader and its operation can be found in U.S. patent application Ser. No. 08/609,344, filed Mar. 1, 1996, and entitled PORTABLE DATA COLLECTION DEVICE WITH LED TARGETING AND ILLUMINATION ASSEMBLY, the contents of which are incorporated herein in the entirety by reference.

Figure 7:
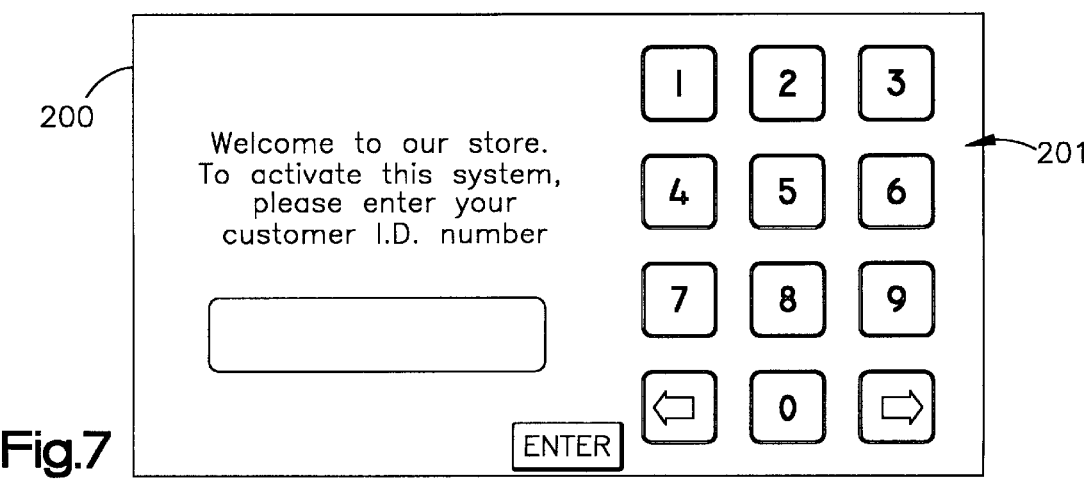
FIG. 7 is a representative welcoming display displayed on a touch sensitive display screen of the portable data collection device of FIG. 1.
Figure 6:
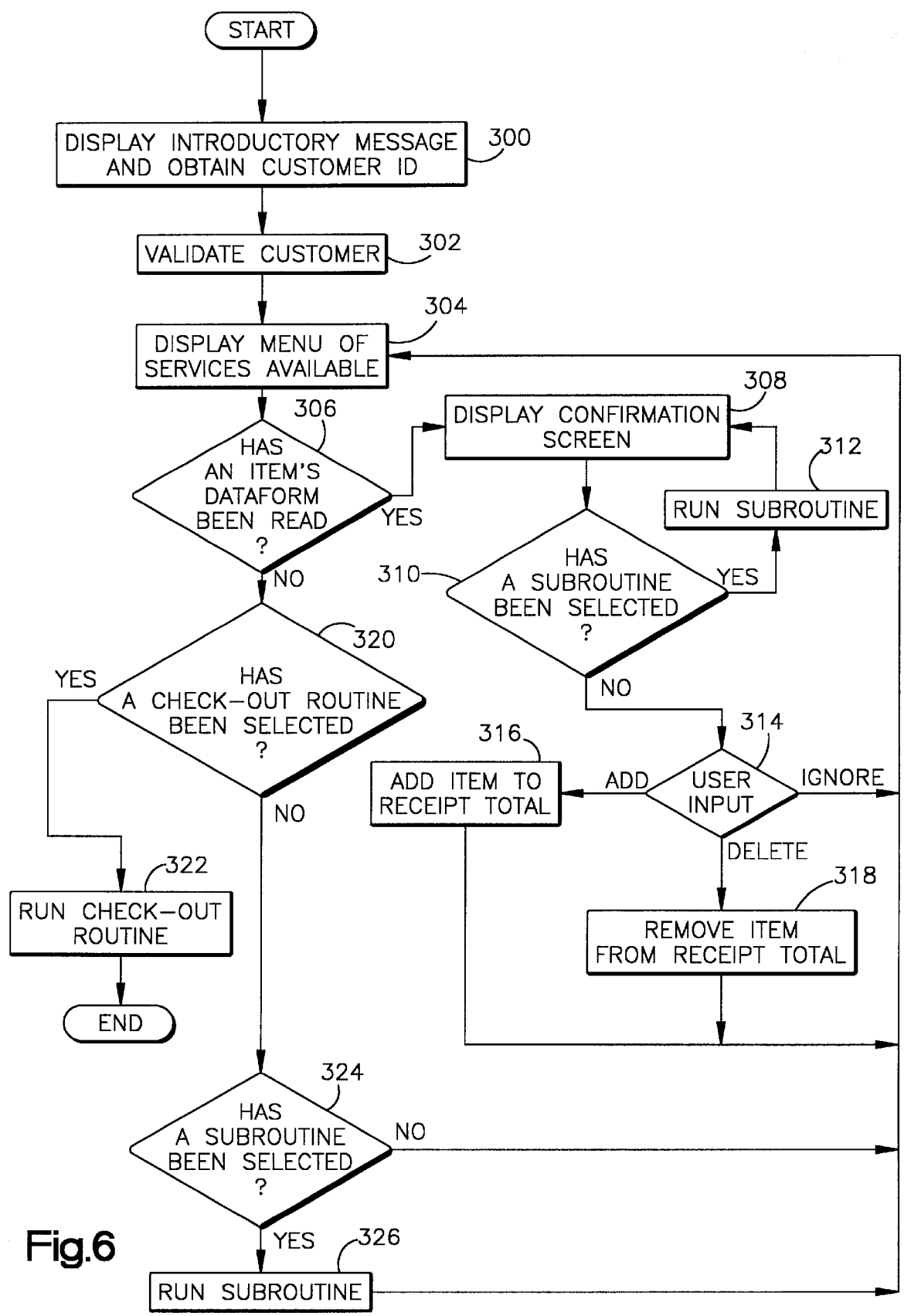
FIG. 6 is a flow chart representing processing steps of the portable data collection device of FIG. 1 in connection with a shopping session at a retail store using the device.

FIG. 6 is a flowchart of an operational routine of the portable data collection device 10 in accordance with the present invention. When the shopping cart 18 is idle at the front of the store, an introductory message 200 is displayed on the screen 14. A typical introductory message is shown in FIG. 7. As indicated at step 300 in FIG. 6, the message 200 includes a brief welcome message, which could include promotional advertising, and instructions to enter a customer identification number. The customer identification number may be entered by touching the interactive touch sensitive display screen 14 at appropriate areas or blocks of the screen where a virtual keypad 201 is displayed on the screen. Alternatively, the customer identification number may be entered into the device by using the dataform reader 22 to read a bar code dataform on a customer ID card (not shown) or by swiping the magnetic stripe of the customer ID card through the magnetic stripe reader 60. After entry of the customer identification number, the customer will be prompted to enter a personal identification number (PIN number).

After the customer has entered an ID number and a PIN number, the identification routine proceeds to step 302 where the customer ID and PIN numbers are validated. Validation includes transmitting the customer ID number and PIN to the host computer 1260 using the communication circuitry 118 where the numbers are compared to a list of valid numbers. The host computer 1260 transmits a valid or invalid signal back to the device 10. The customer ID number and PIN number may be encrypted utilizing standard encryption techniques to prevent unauthorized parties from obtaining the numbers by intercepting the rf transmissions.

Figure 8:
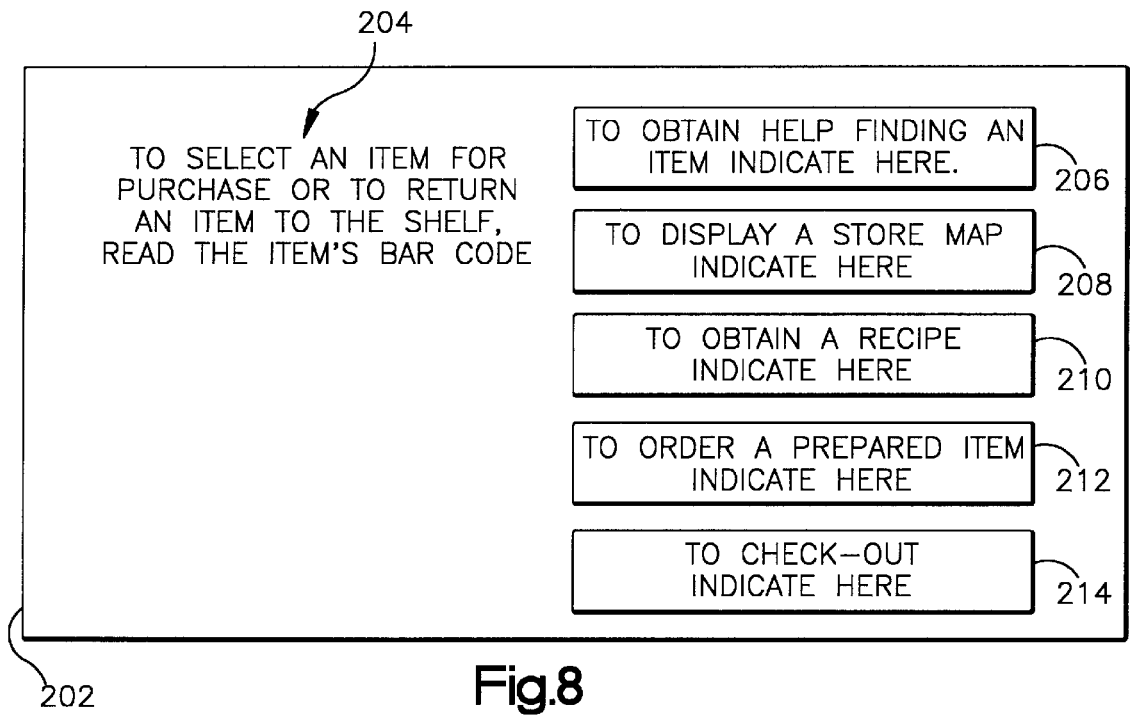
FIG. 8 is a representative introductory menu displayed on the touch sensitive display screen of the portable data collection device of FIG. 1 in connection with a shopping session.

After the device processor 32 has received a validation signal, a menu of services available screen menu 202 is displayed on the display 14 at step 304. The menu 202 of services offered is shown in FIG. 8. The menu includes a message 204 indicating that the customer may read a bar code dataform of an item to select the item for purchase or to remove a previously selected item from the customer's running total of purchases stored in the memory 106. Additionally, the menu 202 lists several other services available to the operator. To select one of these services, the operator may press an area of the screen 14 corresponding to the appropriate virtual buttons 206, 208, 210, 212, 214 on the display 14. Step 306 of FIG. 6 represents the customer reading a bar code dataform associated with an item or selecting a service. If the customer reads a bar code dataform, the routine proceeds to step 308 where a confirmation screen display 220 is displayed to the customer.

Figure 9:
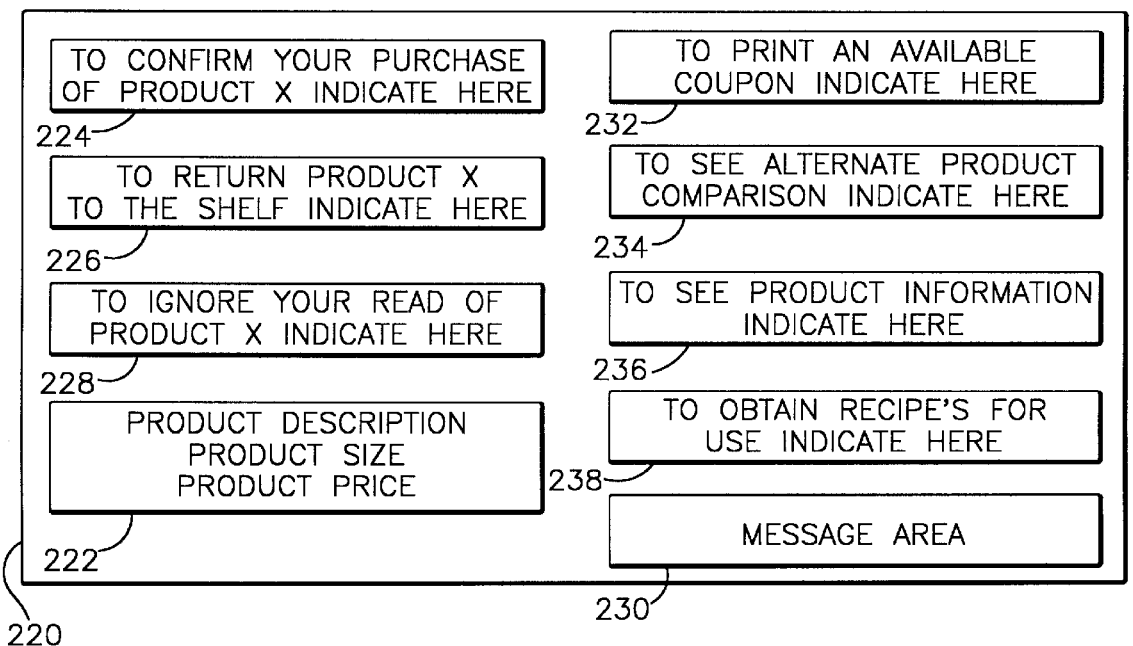
FIG. 9 is a representative menu displayed on the touch sensitive display screen of the portable data collection device of FIG. 1 after an item's bar code dataform has been read.

A sample confirmation screen display 220 is shown in FIG. 9. The confirmation screen display 220 includes an information area 222 in which a product name or description, product size, and product price of the item whose data was read is displayed. This information associated with the item is obtained from a database accessed by the host computer 1260. The item's dataform includes a product identifier or identification number. Upon decoding the item's dataform, the processor 32, in cooperation with the communications circuitry radio transceiver module and utilizing a spread spectrum cellular communications system, causes the product identifier to be transmitted via rf communications to the host computer 1260, which also has a transceiver and is part of the cellular communications system. The host computer 1260 accesses a database (not shown) to find a product name, product size, and price associated with the product identifier. The host computer 1260 transmits the retrieved data associated with the item in packets along with suitable control, error checking and protocol data. The radio transceiver module of the device 10 receives the transmission of the retrieved data and the processor 32 causes some or all of the retrieved data to be displayed in the information area 222.

Based on the information displayed in the information area 222, the customer may confirm his or her desire to purchase the item by pressing an area of the screen 14 corresponding to virtual button 224 (the product name of the item is inserted in the space labeled "PRODUCT X" in button 224). If the customer does not wish to purchase the item whose dataform was read, the customer presses an area of the screen 14 corresponding to virtual button 226 (assuming the item had previously been selected for purchase). If the customer wishes to simply ignore the dataform read just completed, an area of the screen 14 corresponding to virtual button 228 is touched. The confirmation screen display 220 may also include a message area 230 where other information about the product may be displayed. For example, if the product is a tobacco product, the Surgeon General's warning may be displayed. If the product contains alcohol the message area may indicate that the age of the purchaser will be confirmed upon leaving the store.

In addition, the confirmation screen display 220 may advantageously include a menu listing categories of information available to the customer. For example, if there is a coupon or rebate offered by the store for a particular product, a menu selection represented be virtual selection button 232 will, if an area of the screen 14 is touched corresponding to the button 232, cause the printing assembly 62 to print the coupon or rebate. If the store has alternative products and wants to give the customer a greater selection, the display 220 may provide an optional menu selection which, if an area of the screen 14 is touched corresponding to the button 234, will cause the screen to display a list of alternative products, a description of each and the price per unit of each.

The confirmation screen display 220 may also provide an optional menu selection which, if an area of the screen 14 is touched corresponding to a virtual button 236, will cause the screen 14 to display of additional information such as nutritional information for the selected product. Another optional menu selection of the display 22 is shown as virtual button 238 which provides the customer with recipes for use of the selected product. If the virtual selection button 238 is selected, the display 14 would show the names of all recipes from the store's recipe data base which use the product an one or more of the recipes may be selected for printing by the printing assembly 62.

As indicated in FIG. 6 at step 310, if a menu selection button 232, 234, 236, 238 is selected, the program for the block will be executed by the processor 32 as a separate subroutine at step 312 and, when finished, will return the customer to the confirmation screen display 220 at step 308. If a subroutine is not selected, the routine waits for operator confirmation at step 314. If the customer selects to purchase the item by pressing virtual button 224 to purchase the item, the routine advances from step 314 to step 316 where the item is added to the customer's running total list of purchases stored in the memory 106. The routine then returns to the menu of services available at step 304. If the customer wishes to delete the item whose dataform was previously read and confirmed for purchase, an area of the screen 14 corresponding to virtual button 226 is touched and the routine advances from step 314 to step 318. This option is chosen where the item was previously confirmed for purchase using virtual button 224 earlier in the shopping session and later in the session the customer has changed his or her mind about purchasing the item and wants to return the item to the shelf and delete the item from the running list of purchases in the memory 106. At step 318, the item is removed from the customer's running list of purchases. After deletion, the routine returns to the menu of services available at step 304.

If the customer has not previously confirmed the item for purchase and does not wish to purchase the item, an area of the screen corresponding to virtual button to 228 is pressed, causing the routine to disregard or ignore the dataform read. In this case, the routine loops from step 314 back to the services menu 202 at step 304. If at step 306, the customer did not read a bar code dataform, the routine advances to step 320 where it checks whether the customer has selected the checkout routine. If an area of the screen 14 corresponding to virtual button 214 has been pressed, the selected service is checkout and the routine advances to step 322 where the checkout routine (FIG. 10) is run and then the process ends.

If the checkout routine has not been selected at step 320, the routine advances to step 324 where it determines if another subroutine corresponding to virtual buttons 206 (help find an item subroutine — FIG. 12), 208 (display store map subroutine—FIG. 16), 210 (obtain a recipe subroutine—FIG. 14), 212 (order a prepared item subroutine—FIG. 17). If another subroutine has not been selected, the routine loops back to step 304 where the screen layout 202 of menu services is displayed to the customer. However, if at step 324, a subroutine has been selected, the routine advances to step 326 where the service subroutine is run. Upon completion of the subroutine, the routine again returns to step 304 where the menu services screen layout 202 is displayed.

Figure 10:
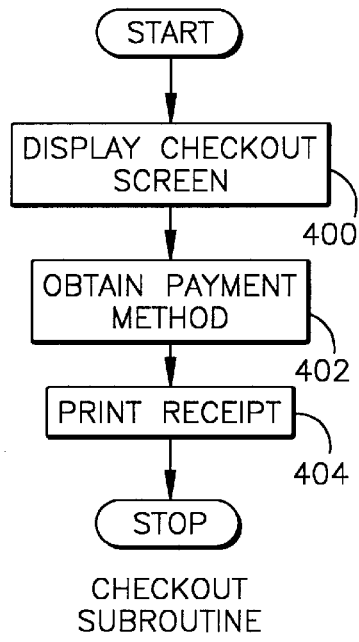
FIG. 10 is a flow chart representing processing steps of the portable data collection device of FIG. 2 in connection with a routine for checking out items selected for purchase.
Figure 11:
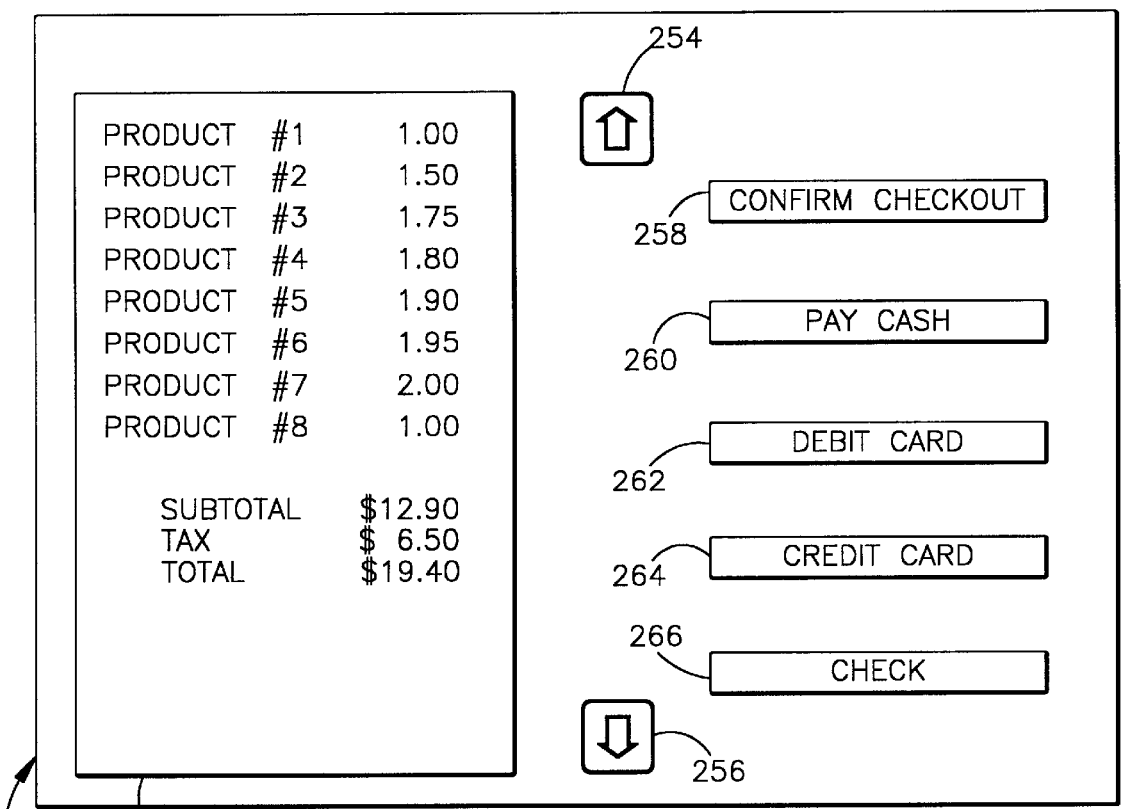
FIG. 11 is a representative screen layout displayed on the touch sensitive display screen of the portable data collection device of FIG. 1 in connection with a routine for checking out items selected for purchase.

The checkout subroutine is shown in FIG. 10. In the first step 400, the subroutine displays a checkout screen to the customer. FIG. 11 is an example screen display 250 for checking out. The display 250 includes a receipt area 252 where an image of the customer's receipt appears. Two virtual scroll arrows 254, 256 are used by the customer to scroll a lengthy receipt. When the customer has finished reviewing the receipt, he or she must confirm the checkout by pressing an area of the screen 14 corresponding to a virtual confirmation button 258 and select a payment method at step 402. A payment method is selected by touching an area of the screen 14 corresponding to a cash payment virtual button 260, a debit card payment virtual button 262, a credit card payment virtual button 264 or a check payment virtual button 264. At step 404, a printout of the receipt is printed by the printing assembly 62 and the checkout subroutine ends.

Figure 12:
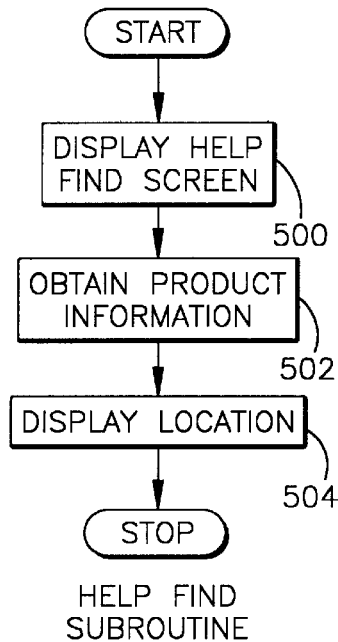
FIG. 12 is a flow chart representing processing steps of the portable data collection device of FIG. 1 in connection with a help routine for aiding a customer find a desired item.
Figure 13:
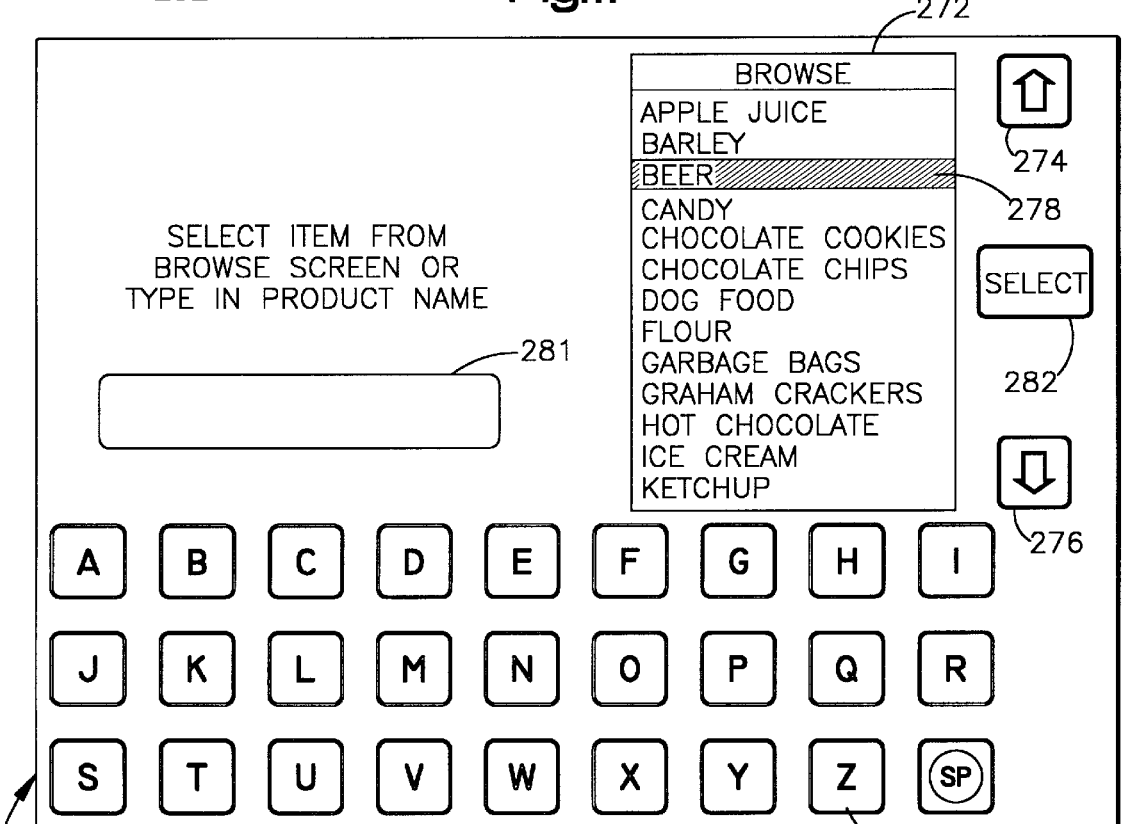
FIG. 13 is a representative screen layout displayed on the touch sensitive display screen of the portable data collection device of FIG. 1 in connection with a help routine for aiding a customer find a desired item.
Figure 18:
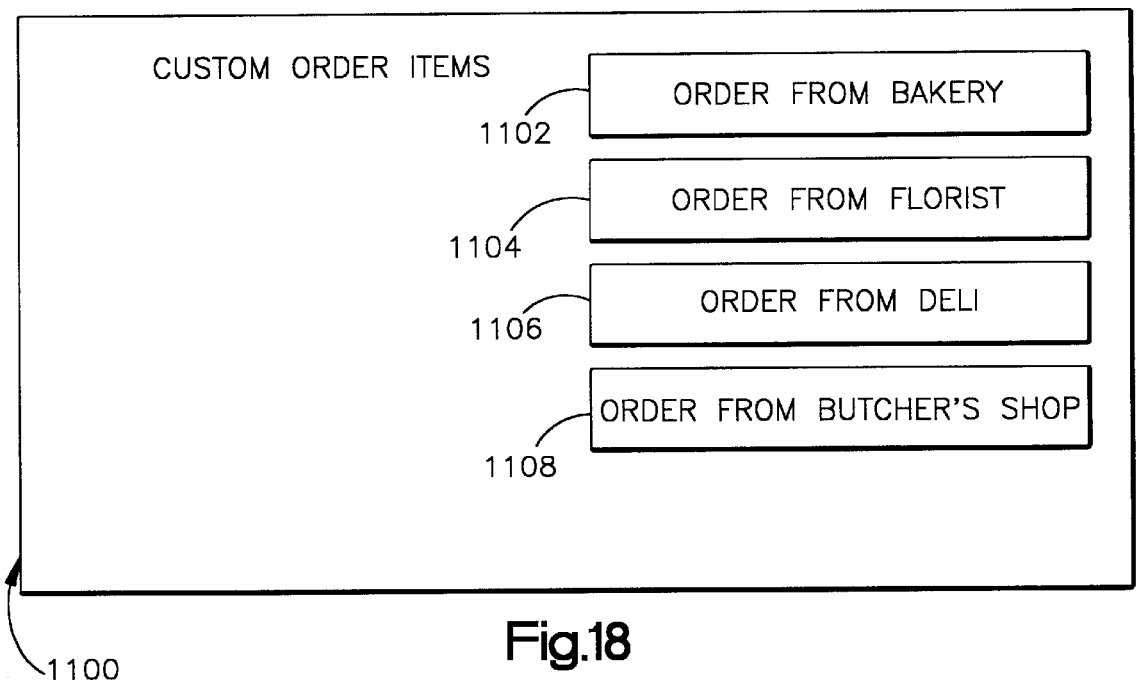
FIG. 18 is a representative screen layout displayed on the touch sensitive display screen of the portable data collection device of FIG. 1 in connection with a routine for permitting a customer to order a prepared item during a shopping session.

FIG. 12 is a flowchart of the help find subroutine associated with block 206 of the introductory menu 202 (FIG. 8). At the first step 500, a help find screen is displayed to the customer. A sample screen display 270 is shown at FIG. 13. An alphabetical list of products is displayed in a scroll box 272. At step 502, virtual arrow buttons 274, 276 are used to scroll a highlight bar 278 through the list. Alternatively, the virtual keyboard 280 may be used to input a product name by sequentially pressing areas of the screen 14 to spell out a product name. As the product name is spelled out, the typed letters will appear in block 281 and the scroll list will move to the products which fit the partially typed description. After the customer has positioned the highlight bar 278 over the desired item, a virtual select button 282 is used to confirm the highlighted choice, the help find subroutine advances to step 504 where the location of the selected item is displayed to the customer.

Figure 14:
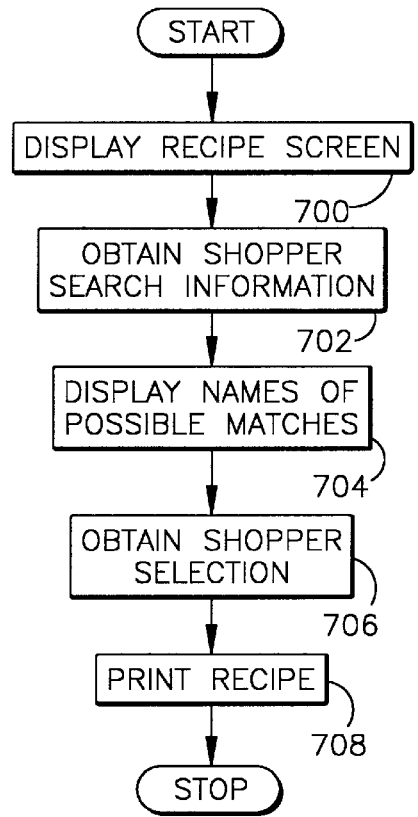
FIG. 14 is a flow chart representing processing steps of the portable data collection device of FIG. 1 in connection with a routine for providing a recipe using a selected food item.

FIG. 14 is the subroutine for finding a recipe associated with a product. The first step 600 displays a recipe screen display 790 (shown at FIG. 15) to the customer. The customer uses a virtual keyboard 792 to enter a search word which appears in block 794. Alternatively, the reader 22 can be used to read a dataform of an item, upon decoding the item's dataform, the name of the product will automatically be entered in block 794 as the search term. Once entered, the customer will use virtual keys 796, 798 to select to search the word entered in block 794 by title (virtual key 794) or by ingredient (virtual key 796). Customer search word entry is represented by step 702. At step 704, the list of matches is shown in scroll box 800. Virtual scroll arrows 802, 804 are used to move a highlight bar 806 over the list. When the highlight bar 806 is over a desired item, a virtual select button 808 is used to select a recipe. User selection of a desired item with the highlight bar 806 and the select key 808 is indicated by step 706. At step 708, the selected recipe is printed by the printing assembly 62.

FIG. 16 is a flowchart of the subroutine to display a store map. This routine is associated with block 208 of the introductory menu 202. The subroutine has only a single step 900 which is display a store map on the display screen 14. FIG. 17 is a flowchart for a subroutine which enables the shopper to order prepared food such as a deli order or a cake order during the course of a shopping session. This routine is associated with selection of block 212 of the introductory menu screen layout 202. At step 1000, an order screen menu 1100 is displayed on the display screen 14. The menu 1100 includes virtual buttons corresponding to a to listing of departments from which custom ordered items can be ordered. The departments which produce custom ordered items include the bakery department (virtual button 1102), the florist department (virtual button 1104), the delicatessen department (virtual button 1106) and the butcher or meat department (virtual button 1108). Step 1002 of the subroutine represents obtaining shopper input. This may represent merely selecting an item from a selection screen display (not shown, but similar to the scroll box 272, except that the items would be limited to custom ordered items available from the selected department). Or, if the desired item requires customization such as a birthday cake, step 1002 may represent electronically paging through several screens to select the appropriate cake and frosting design and entering the recipient's name and age. Once the desired item is entered, the routine advances to step 1004, where the order is confirmed. When the store has the item ready, the customer may be alerted by a tone emitted from the speaker 130 or a message (not shown) flashed on the display screen 14 alerting the customer that the custom ordered item may be picked up from the appropriate department.

Figure 19:
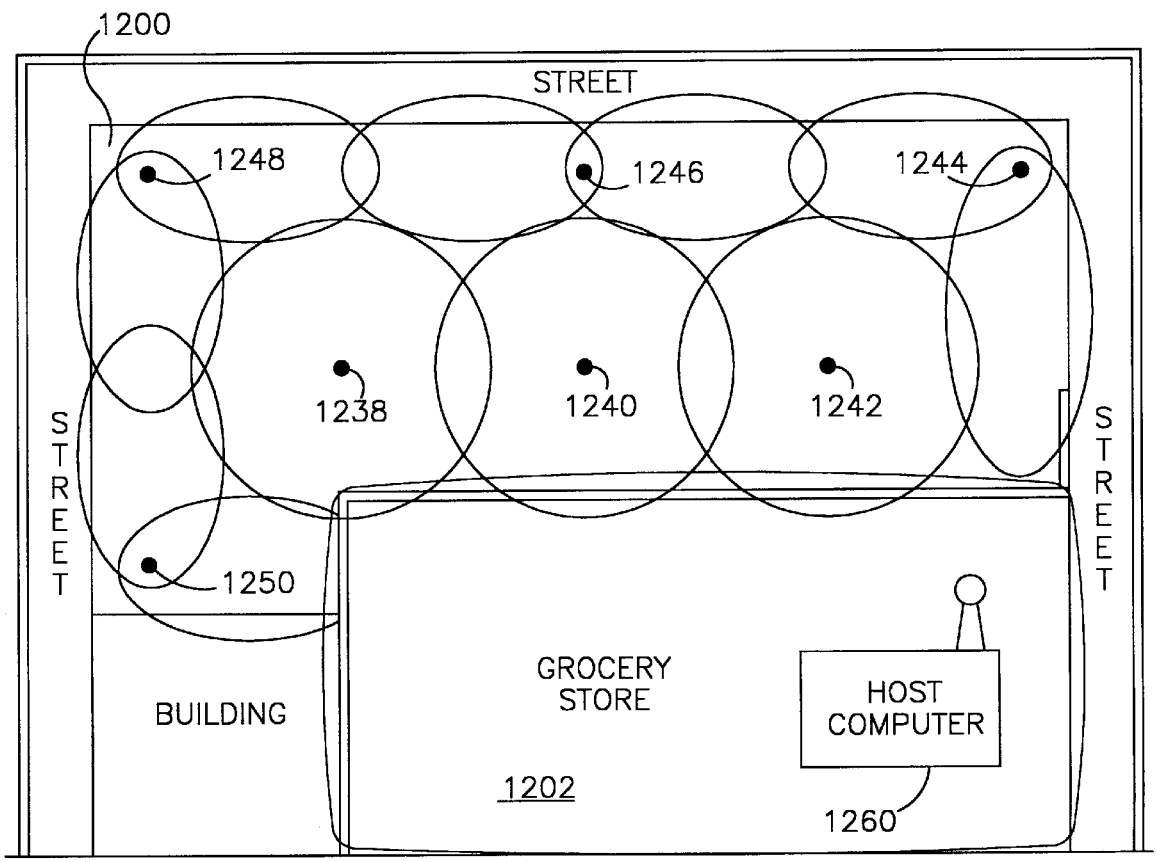
FIG. 19 is a schematic representation of communication cells of a cellular communications system utilized by a spread spectrum communications circuitry of the portable data collection device of FIG. 1.

FIG. 19 is a schematic diagram of access point coverage of the spread spectrum cellular communication network in a parking lot 1200. As noted above, the device's communication circuitry 118 utilizes the spread spectrum cellular communication network for communicating with the host computer 1260. Access points 1238, 1240 and 1242 represent interior access points of the network. Interior access points have omni-directional antennas and therefore approximately circular areas of communications coverage or cells. Access points 1244, 1246, 1248 and 1250 are perimeter access points of the network. Each has a directed antenna for forming coverage areas or cells as indicated by the two ellipses drawn around each of the points.

The portable data collection device 10 mounted on the shopping cart 18 which is pushed to a customer's car in the shopping parking lot 1200 may roam from cell to cell and maintain radio contact with the host computer 1260, which also functions as an access point and has a coverage area substantially equal to the boundaries of the store 1202. Therefore, the device 10 provides an assistance call and anti-theft routine.

Figure 20:
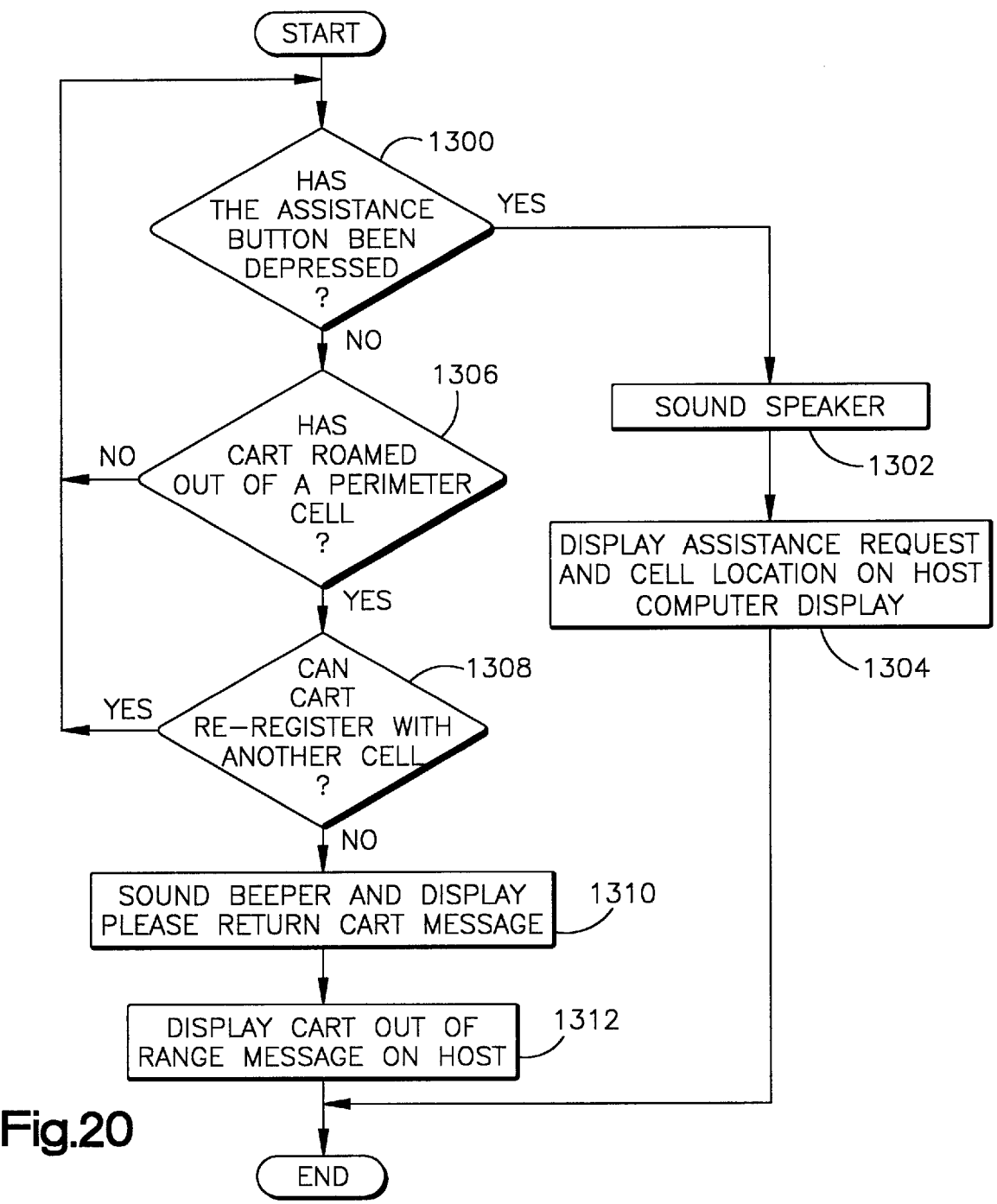
FIG. 20 is a flow chart representing processing steps of the portable data collection device of FIG. 1 in connection with a routine for providing customer assistance and monitoring a location of the shopping cart.

FIG. 20 is a flowchart of the operation of the assistance call and anti-theft subroutine. At step 1300, the subroutine monitors whether the assistance button 68 has been depressed. If the button has been depressed, the device 10 emits a loud beeping noise from the speaker 130 at step 1302 and store personnel are notified through a message displayed on a visual display screen of the host computer 1260 at step 1304. The message includes a location of which cell the cart 18 is in. Appropriate store personnel can then assist the customer.

Alternatively, if at step 1300, the assistance button 68 is not depressed, the subroutine, at step 1306, checks whether the cart 18 has been pushed out of range of its current cell, if the cart 18 is out of its current cell, the subroutine determines, at step 1308, if it can reregister the devices communications circuitry 118 with another access point. If the cart 18 has roamed out of range of the device's current cell and cannot be reregistered with another access point, then the shopping cart 18 has left the bounds of the store and the parking lot. At step 1310, the speaker 130 on the cart is continuously sounded and a message is continuously flashed on the display screen 14 which requests that the cart 18 be returned to the store. At step 1314, an appropriate message is displayed on the display screen of the host computer 1260 to alert store personnel that the cart 18 has been taken from store property and providing information setting forth the last cell the cart 18 was in.

An appropriate wireless local area network system including access points and communications circuitry for the device is available from Aironet Wireless Communications, Inc. of Akron, Ohio under the product name "Arlan System". Other appropriate cellular network systems would be those complying with the draft IEEE 802.11 standard. Details of a spread spectrum cellular communications network are set forth in U.S. patent application Ser. No. 08/523,942, filed Sep. 6,1995, and entitled CELLULAR COMMUNICATION SYSTEM WITH DYNAMICALLY MODIFIED DATA TRANSMISSION PARAMETERS, the contents of which are incorporated herein in the entirety by reference.

Figure 21:
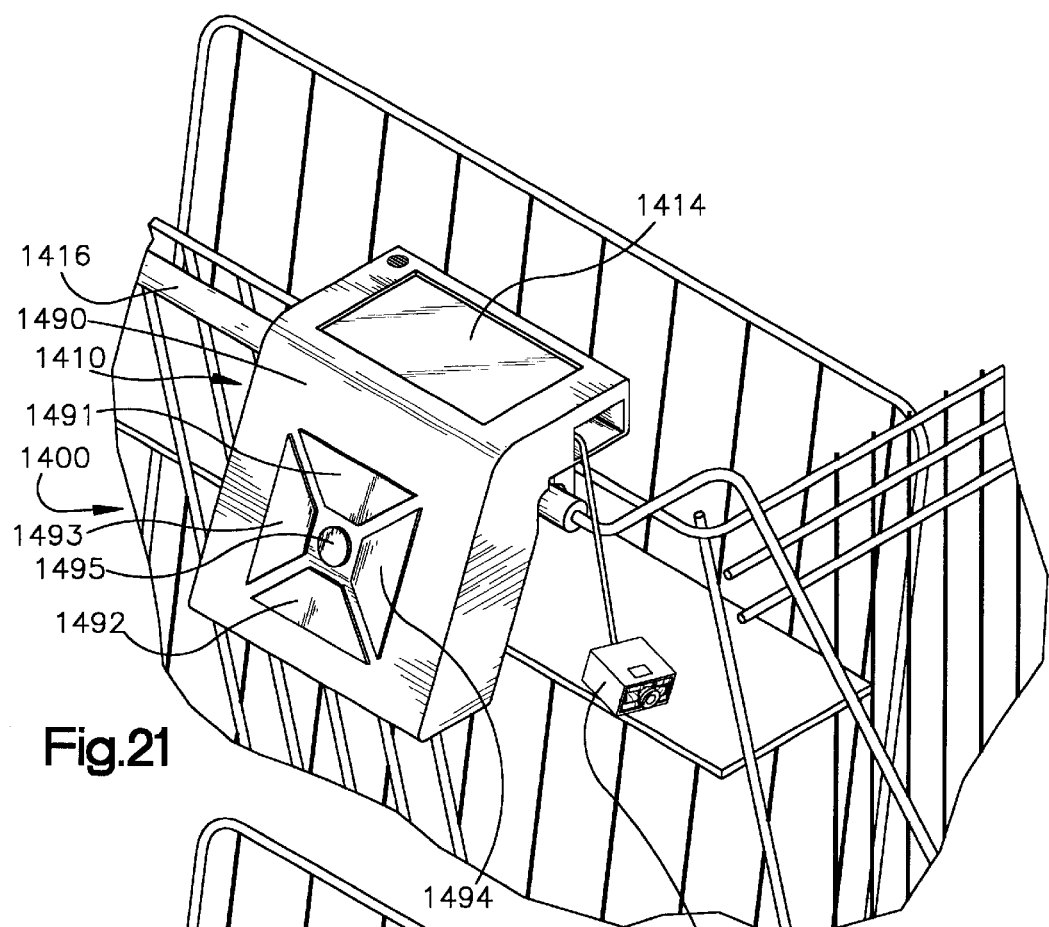
FIG. 21 is an alternate embodiment a portable data collection device of the present invention mounted on a shopping cart.

FIG. 21 is an alternate embodiment of the portable data collection device of the present invention. The device 1400 includes a housing 1410 which has an inverted "L" shape in cross-section and is releasably mounted on a pushing handle 1416 of a shopping cart 1414. A larger portion of the housing 1410 extends below the pushing handle 1416 than the housing of the first embodiment. A similar clamping mechanism as that disclosed in the first embodiment secures the housing to the cart handle 1416. A battery (not shown) supported in a casing on a lower rack of the cart powers the device's electrical circuitry and modules as in the first embodiment.

The device 1400 includes electrical circuitry in the housing 1410 and a retractable dataform reader 1422 which is similar to the circuitry described in connection with the device 10 described in the first embodiment and includes a display screen 1414 with an interactive touch sensitive overlay, similar to the display screen 14 in the first embodiment. The device 1400 further includes the retractable dataform reader 1422, which is similar to the reader 22 described in the first embodiment and includes a cable recoil mechanism which is similar to the cable recoil mechanism 138 described in the first embodiment. A front surface 1490 of the housing includes four outer depressible buttons 1491, 1492, 1493, 1494 surrounding a central depressible button 1495. The top and bottom buttons 1491, 1492 function as up and down directional arrow keys when a highlight bar is displayed on the display screen 1414 and the right and left buttons 1493, 1494 function as right and left directional arrow keys when a cursor is displayed on the display screen.

Figure 22:
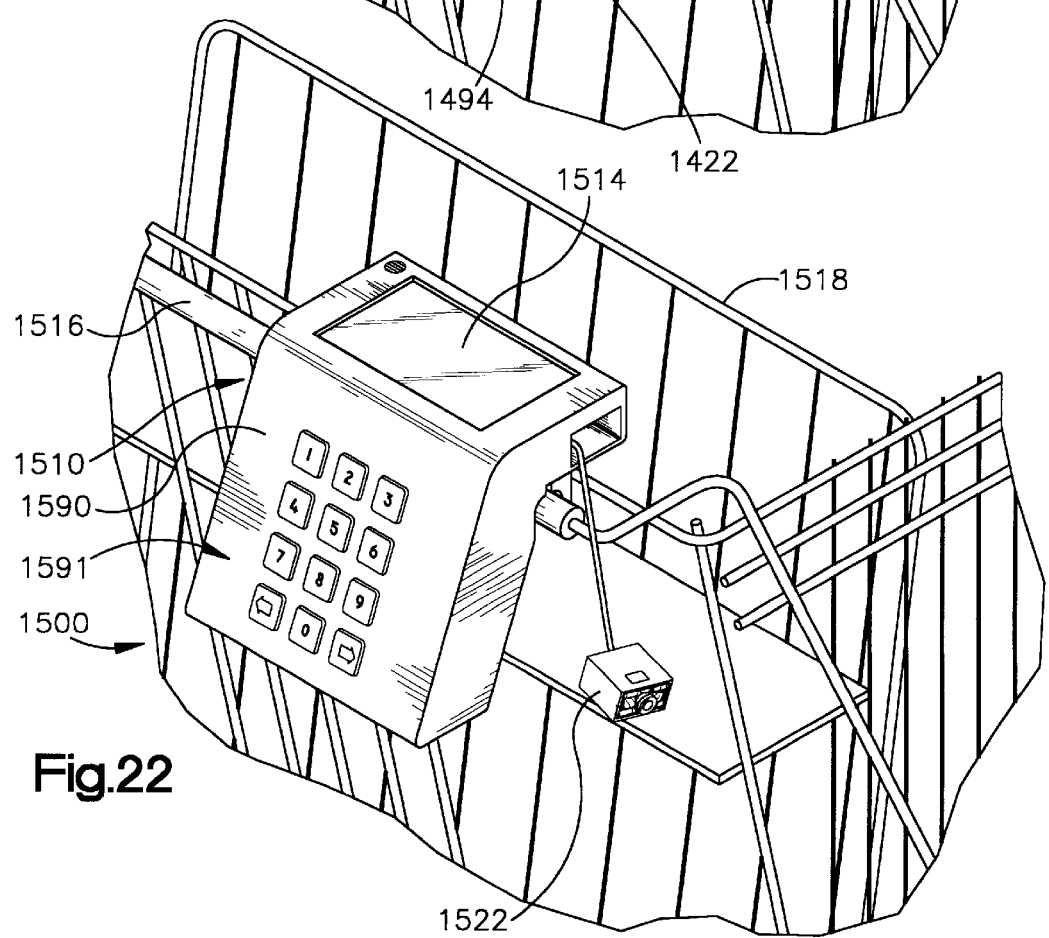
FIG. 22 is another alternate embodiment of a portable data collection device of the present invention mounted on a shopping cart.

FIG. 22 is another alternate embodiment of the portable data collection device of the present invention. The device 1500 includes a housing 1510 which is "L" shaped in cross section and is releasably mounted on a pushing handle 1516 of a shopping cart 1514. A larger portion of the housing 1510 extends below the pushing handle 1516 than the housing of the first embodiment. A similar clamping mechanism as that disclosed in the first embodiment secures the housing to the cart handle 1516. A battery (not shown) supported in a casing on a lower rack of the cart powers the device's electrical circuitry and modules as in the first embodiment.

The device 1500 includes electrical circuitry disposed in the housing 1510 and a retractable dataform reader 1422 which has electrical circuitry which is similar to the electrical circuitry described in the first embodiment and includes a display screen 1514 with an interactive touch sensitive overlay, similar to the display screen 14 in the first embodiment. The device 10 further includes the to retractable dataform reader 1522, which similar to the reader 22 described in the first embodiment and includes a cable recoil mechanism similar to the cable recoil mechanism 138 described in the first embodiment. A front surface 1590 of the housing includes a keypad 1591 comprising a plurality of depressible keys. The keys of the keypad function to permit numeric input to the device processor in lieu of the virtual numeric keypad display on the display screen 14 set forth in the first embodiment.

FIGS. 23–26 illustrate a battery charging station constructed according to a preferred embodiment of the invention for charging batteries used to power shopping cart mounted data collection devices (such as the devices described above in connection with the previous embodiments). The charging station shown in FIGS. 23–26 is constructed to engage a portion of one or more shopping carts and conducts current from a source of electricity (not shown) to a battery carried by each cart. This application is a preferred embodiment of the invention; however, those skilled in the art will appreciate that the features of the charging station of the invention permit its use in battery charging applications other than that specifically shown in the Figures, the charging station or apparatus being useful to charge batteries irrespective of the end use of the batteries. With this in mind, persons skilled in the art should not interpret this aspect of the invention as necessarily being limited to charging batteries carried by shopping carts or other movable article carriers.

Figure 23:
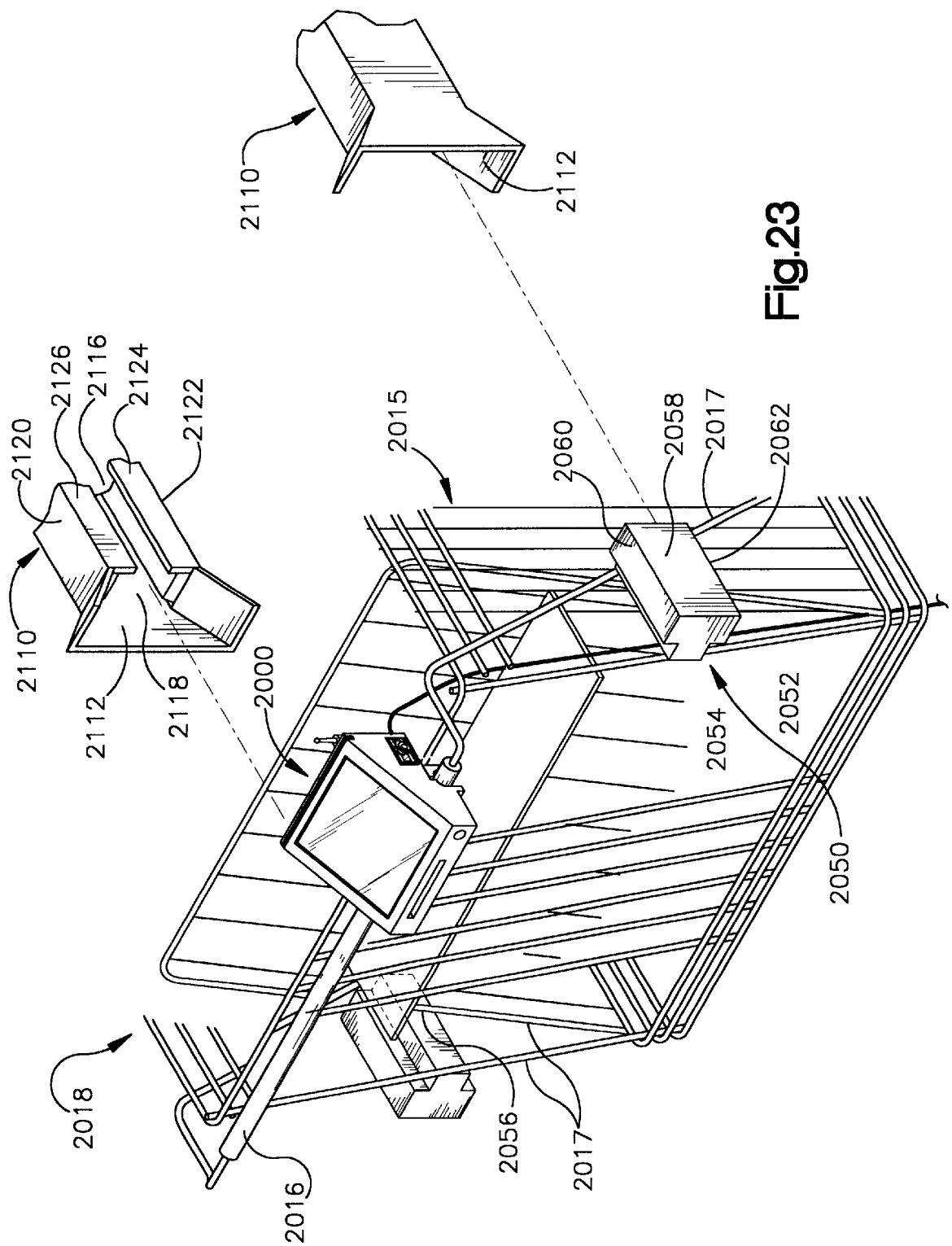
FIG. 23 is a perspective view of a battery charging station according to another embodiment of the invention, wherein a shopping cart provided with a battery powered data collection device is aligned for engagement with a guide track of the charging station.
Figure 25:
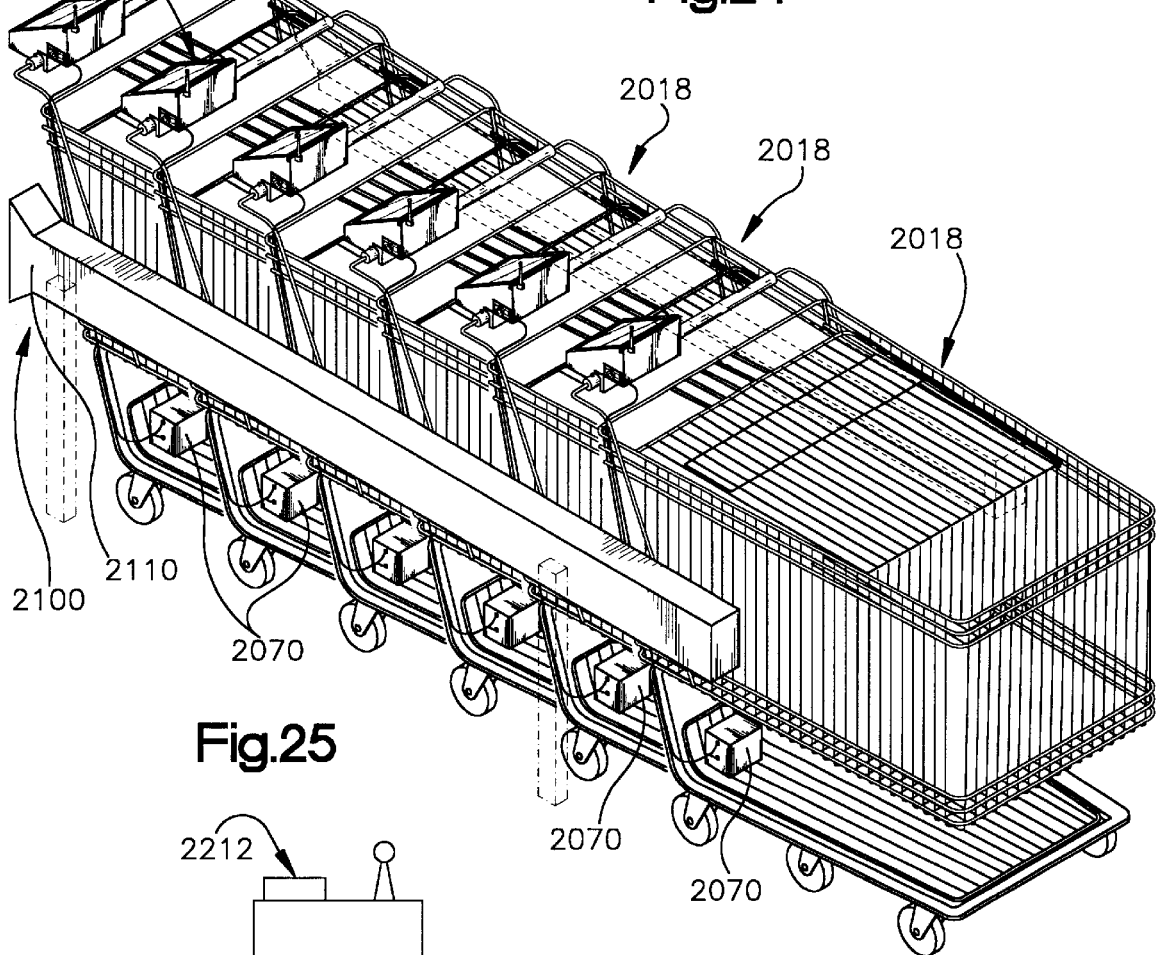
FIG. 25 is a perspective view of the invention of FIGS. 23 and 24 wherein a plurality of shopping carts are engaged with the charging station guide track.

Referring to FIG. 23, data collection device 2000 is mounted to handle 2016 of a shopping cart 2018, the cart comprising a basket frame 2015 including frame members 2017. A battery 2070, which may have the same construction as battery 70 described above, is mounted to the cart 2018 in any convenient location, such as the lower cart portion as seen in FIG. 25. The structure of data collection device 2000 may be the same as that described in connection with the embodiments shown in FIGS. 1–22, including variations and alterations thereof. Likewise, cart 2018 may be constructed in the same manner as the carts described above in relation to previous embodiments.

In order to permit charging of battery 2070, cart 2018 is provided with a connection element 2050 adapted to engage battery charging station 2100. Suitable wiring 2080 connects the element 2050 to battery 2070 such that current received from a source (not shown), e.g. a 6 volt battery charger, is conducted to the battery. The preferred configuration of connection element 2050 is best seen in FIG. 23 and comprises a block formed of plastic or any other suitable material. The element 2050 preferably has a T-shape defined by cross portion 2052 and leg portion 2054, the end surface of leg portion 2054 being connected to a frame member 2017 (FIG. 23) of cart 2018 by any suitable means, e.g., adhesive, fasteners, welding, etc. As described further below, the material and shape of connection element 2050, in and of itself, is not critical insofar as least part of the element is able to conduct current from the charging rail to the battery.

A battery charging station indicated generally by the reference numeral 2100 comprises a guide rail 2110 having an enlarged opening 2112 at one end and a narrower slot 2114 running along the side of the rail. FIG. 23 shows a pair of guide rails 2110 which engage corresponding connection elements 2052 carried by cart 2018. A benefit of using two guide rails is that the cart is more easily guided into the charging station due to the rails engaging each side of the cart, thereby reducing the likelihood of faulty engagement with or damage to the charging rail. It should be noted that one or both of the guide rails 2110 may be provided with means for charging batteries, just as one or both of connection elements 2050 may be provided with means for conducting current to the battery. For example, one guide rail could be used to charge the batteries while the other guide rail merely serves to guide the carts into the charging station. Moreover, the carts may be provided with one, two or more connection elements to provide additional flexibility in engaging the carts with the guide rail. If the carts are provided with only one connection element, the double guide rail arrangement shown in FIG. 23 may be used with each rail having means for charging a battery, thereby permitting cart mounted batteries to be charged at the station regardless of which side of the cart carries the connection element 2050. Of course, alternatively, only one guide rail 2110 may be used to engage a cart having one connection element, if desired.

Figure 24:
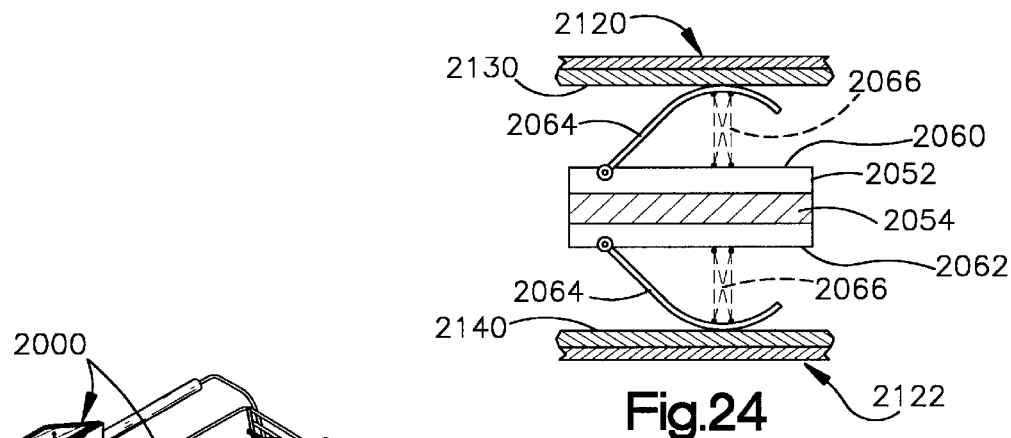
FIG. 24 is a front elevation view of the embodiment of FIG. 23 showing the electrical connection between the shopping cart and charging station guide track.

As seen best in FIGS. 23 and 24, guide rail 2110 is configured to receive a connection element 2050 carried by each cart 2018 and, to that end, comprises an enlarged opening 2112 leading to a T-shaped channel 2114 defined by a side slot to 2116, and an interior 2118 that is enlarged with respect to slot 2116. The rail 2110 has a top wall 2120 and bottom wall 2122 with, respectively, inner surfaces 2130 and 2140 facing channel interior 2118. Side flanges 2126, 2124 respectively extend from top and bottom walls 2120, 2122 to form side slot 2116. As will be appreciated from the Figures, cart connection element 2050 is received in guide rail 2110 with the leg portion 2054 of element 2050 extending through (and sliding along) guide rail slot 2110. As shown in FIG. 25, the connection element 2050 preferably is located at or near the rear of each shopping cart 2018 so that the carts can be nested one behind the other with the connection element 2050 of each cart received in the guide rail 2110. This feature permits a retailer (or other party) to store the shopping carts in a conventional, nested manner to save floor space, while at the same time charging the batteries on the carts.

The manner in which the charging station 2000 and guide rail 2110 charge the cart mounted batteries will now be described. FIG. 24 shows connection element portions 2052, 2054 and guide rail upper and lower walls 2120, 2122. The element 2050 is provided, preferably near the upper and lower walls 2120, 2122 thereof, with electrical contacts 2064 biased in an outward direction by springs 2066. The contacts 2064 are shown pinned at one end to connection element 2050 so as to pivot outward under force of springs 2066 toward the interior surfaces 2130, 2140 of guide rail walls 2120, 2122. At least a portion of the interior surfaces 2130, 2140 is provided with (or formed of) a conductive material such that electrical current will be conducted from the charging guide rail 2110 to the connection element 2050. For example, the upper and lower walls 2120, 2122 of the guide rail may comprise two or more layers (two layers being shown in FIG. 24), the innermost layer possessing electrically conductive characteristics. Similarly, the electrical contacts 2064, in whole or in part, may be provided with (or formed of) electrically conductive material and, in addition, are connected to battery 2070 via suitable wiring 2080 (FIG. 25). Upon the connection element 2050 entering the charging station and being received in guide rail 2110, electrical current from a source (not shown) passes through conductive areas of interior surfaces 2130, 2140 to electrical contacts 2064, and then through wiring 2080 to battery 2070.

It should be appreciated that while FIG. 24 depicts two electrical contacts 2064, one or more contacts may be included on the connection element 2050 to engage the conductive surfaces of the guide rail. In a similar manner, although guide rail 2110 has conductive areas on both its upper and lower walls, only one area could be used provided there was sufficient contact between the guide rail and connection element to charge the battery. In other words, the inventive aspects of the battery charging station disclosed herein are not limited to the particular number and/or placement of electrical contacts or guide rail conductive surfaces, or the specific shape of the cooperating portions of the guide rail and connection element. Rather, what is required to practice the invention in its broadest sense is sufficient communication between the charging station guide rail and a connection element (mounted on a shopping cart or not) which conducts current to a battery being charged.

Figure 26:
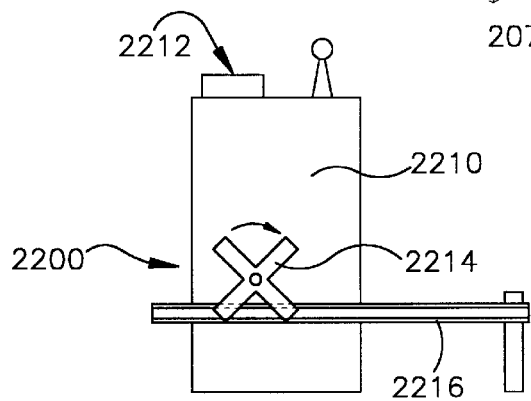
FIG. 26 is a front elevation view, somewhat schematic, of a shopping cart release mechanism forming part of the battery charging station according to another embodiment of the invention.

Referring now to FIG. 26, a mechanism for releasing shopping carts from the charging station 2100 is indicated generally by the reference numeral 2200. While disclosed in combination with the charging station, the cart release mechanism 2200 should not be viewed as limited to releasing only shopping carts provided with battery powered data collection devices. Cart release mechanism 2200 includes a housing 2210 and a turnstile 2214 that rotates (as indicated by the arrow) to release a cart 2018 from a rail 2216 that engages a portion of each cart frame. The turnstile 2214 rotates, for example a quarter turn at a time, in order to release the shopping carts one at a time (much in the same manner as conventional turnstiles employed at bus stations or amusement parks). Each leg of the turnstile 2214 engages a portion of the a cart such that the turnstile must be rotated in order to release the cart to a user, the cart being free to move out of rail 2216 upon its release by the turnstile. Alternatively, the rail 2216 may be omitted such that the turnstile alone engages and locks the cart frame in position. The release mechanism 2200 has controls 2212 that may cooperate with a microprocessor and suitable software to determine whether a request to release a cart should be authorized, such as a request entered by a swiping a card with a bar code or magnetic strip along a reader provided on the housing, entering data via a keypad provided on the housing, etc. The housing may utilize an rf network for communication between the microprocessor and keypad. Cart release mechanism 2200 may be formed as a component of the charging station 2100 or, optionally, as a separate component usable with various shopping cart storage stations.

It is apparent that the charging station of the present invention permits one to charge the batteries that power shopping cart mounted data collection devices by simply placing the cart(s) in the charging station guide rail. The charging station may be used to store the shopping carts while charging the batteries and, if provided with a cart release mechanism, will also control release of the carts. The release mechanism may be actuated in various ways and may interface with a microprocessor to determine whether release of the carts is authorized.

While the present invention has been described with a degree of particularity, it is intended that the invention include all modifications and alterations from the disclosed design falling within the spirit and scope of the appended claims.

I claim:

1. Apparatus for electrically charging a battery carried by a shopping cart for providing electrical power to a portable data collection device affixed to the shopping cart, the apparatus comprising:

an attachment element fixedly attached to the shopping cart and extending from the shopping cart, the attachment element including a first electrical contact electrically coupled to the shopping cart battery and being at a fixed position with respect to the shopping cart;

a guide rail configured to engage the attachment element the guide rail having a first electrically conductive area for electrical connection with the first electrical contact of the attachment element; and means for conducting electrical current from a source to the at least one electrically conductive area of the guide rail;

wherein the shopping cart battery is charged when the attachment element is engaged by the guide rail and the guide rail first electrically conductive area is contacted by the attachment element first electrical contact.

2. Apparatus according to claim 1, wherein the guide rail is a channel with a substantially horizontal elongate opening for slidably receiving the shopping cart attachment element and the guide rail first electrically conductive area is contacted by the attachment element first electrical contact over at least a portion of a path of travel of the attachment element along the elongate opening shopping cart.

3. Apparatus according to claim 2, wherein the channel has spaced apart upper and lower interior surface wall portions disposed on opposite sides of the elongate opening and forming first and second separate electrically conductive areas.

4. Apparatus according to claim 3, wherein the attachment element includes the first electrical contact adapted to contact the channel first electrically conductive area and a second electrical contact adapted to contact the channel second electrically conductive area.

5. Apparatus according to claim 1, wherein the guide rail is configured to simultaneously engage a plurality of attachment elements each of which is fixedly attached to a respective shopping cart charge a plurality of batteries each of which is carried by a different one of the respective shopping carts.

6. Apparatus according to claim 1, further comprises means for controlling removal of the shopping cart attachment element from the guide rail.

7. A method for electrically charging a battery carried by a shopping cart equipped with a portable data collection device, the method comprising steps of:

provididing an attachment element fixedly attached to the shopping cart and having an electrical contact electrically coupled to the shopping cart battery and being at a fixed position with respect to the shopping cart;

providing a charging station including a guide rail configured for releasably engaging the shopping cart attachment element, the guide rail having an electrically conductive portion positioned to make electrical contact with the electrical contact of the attachment element when the attachment element is engaged with the guide rail;

positioning a shopping cart with respect to the charging station such that the attachment element engages the guide rail and the electrically conductive portion of the guide rail electrically contacts the electrical contact of the attachment element; and conducting current from a source of electricity through said electrically conductive portion of the guide rail and the electrical contact of the attachment element to charge the battery of the shopping cart.

8. The method according to claim 7, wherein the portable data collection device comprises a data entry and display terminal removably attached to the shopping cart and powered by the battery.

9. The method according to claim 8, wherein the portable data collection device further comprises a microprocessor and means for storing data relating to products.

10. The method according to claim 7, wherein the guide rail has an elongate opening for slidably receiving the attachment element attached to the shopping cart, the attachment element electrical contact contacting the guide rail electrically conductive portion over at least a portion of a path of travel of the attachment element along the elongate opening.

11. The method according to claim 10, wherein the shopping cart attachment element has first and second electrical contacts in contact adapted to contact respective first and second electrically conductive surfaces of the guide rail.

12. The method according to claim 11, wherein said first and second electrically conductive surfaces of the guide rail are located on upper and lower interior surfaces of the guide rail, and the first and second electrical contacts of the shopping cart attachment element are spring-biased into contact with said upper and lower guide rail interior surfaces.

13. Method for electrically charging a battery carried by a shopping cart equipped with an electronically powered device, the method comprising the steps of:

providing a charging station including a guide rail configured for engaging a plurality of shopping carts each of which is provided with a battery and at least one electronically powered device, the guide rail having at least one first conductive portion positioned to make electrical contact with a second conductive portion located on each of the plurality of shopping carts, the guide rail having a reduced size opening leading to an enlarged interior configured to slidably receive attachment elements carried by the plurality of shopping carts, the plurality of shopping carts being locked to the track while charging;

positioning each of the shopping carts at the charging station with the first conductive portion of the guide rail in electrical contact with the second conductive portion located on each of the shopping carts; and conduction current from a source of electricity through said first conductive portion and each of the second conductive portions to simultaneously charge the batteries of each of the shopping carts.

14. Method according to claim 13, wherein the charging station is provided with means for selectively permitting removal of each of the plurality of shopping carts from the guide rail.

\* \* \* \* \*